US009479786B2

(12) United States Patent
Lu et al.

(10) Patent No.: US 9,479,786 B2
(45) Date of Patent: Oct. 25, 2016

(54) COMPLEXITY ALLOCATION FOR VIDEO AND IMAGE CODING APPLICATIONS

(75) Inventors: Limin Lu, Cupertino, CA (US); Alexandros Tourapis, Milipitas, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 988 days.

(21) Appl. No.: 13/119,492

(22) PCT Filed: Sep. 24, 2009

(86) PCT No.: PCT/US2009/058170
§ 371 (c)(1),
(2), (4) Date: Mar. 17, 2011

(87) PCT Pub. No.: WO2010/036772
PCT Pub. Date: Apr. 1, 2010

(65) Prior Publication Data
US 2011/0164677 A1    Jul. 7, 2011

Related U.S. Application Data

(60) Provisional application No. 61/100,681, filed on Sep. 26, 2008.

(51) Int. Cl.
*H04N 11/02* (2006.01)
*H04N 19/19* (2014.01)
(Continued)

(52) U.S. Cl.
CPC ............ *H04N 19/19* (2014.11); *H04N 19/103* (2014.11); *H04N 19/11* (2014.11); *H04N 19/127* (2014.11); *H04N 19/147* (2014.11); *H04N 19/17* (2014.11); *H04N 19/172* (2014.11);
(Continued)

(58) Field of Classification Search
None
See application file for complete search history.

(56) References Cited

U.S. PATENT DOCUMENTS 5,757,668 A    5/1998    Zhu
6,351,730 B2    2/2002    Chen
(Continued)

FOREIGN PATENT DOCUMENTS

EP    1545133    7/2004
EP    1619901    1/2006
(Continued)

OTHER PUBLICATIONS

Feng et al., "Fast Mode Decision Algorithm for Intraprediction in H.264/AVC Video Coding", Jul. 7, 2005, IEEE Transactions on Circuits and Systems for Video Technology, vol. 15, pp. 813-822.*

(Continued)

*Primary Examiner* — James M Anderson, II

(57) ABSTRACT

Coding method complexity types are assigned to video for combinations of coding decision levels associated with a sequence of pictures, a group of pictures, a scene, a region of the scene or picture, a block or macroblock. Multiple coding units are encoded as a function of complexity and determined from the coding decision levels. A first coding decision level is associated with determining a first complexity and a first coding method type for the sequence of pictures. A second coding decision level is associated with determining a second complexity and a second coding method type for the pictures or scene. The picture or sequence includes the coding units. A third coding decision level is associated with determining a third complexity and a third coding method type for the coding units.

24 Claims, 8 Drawing Sheets

(51) Int. Cl.
H04N 19/176 (2014.01)
H04N 19/147 (2014.01)
H04N 19/172 (2014.01)
H04N 19/61 (2014.01)
H04N 19/11 (2014.01)
H04N 19/103 (2014.01)
H04N 19/127 (2014.01)
H04N 19/17 (2014.01)
H04N 19/179 (2014.01)

(52) U.S. Cl.
CPC ......... *H04N 19/176* (2014.11); *H04N 19/179* (2014.11); *H04N 19/61* (2014.11)

(56) References Cited

U.S. PATENT DOCUMENTS

| | | | |
|---|---|---|---|
| 6,646,578 | B1 | 11/2003 | Au |
| 6,735,339 | B1 | 5/2004 | Ubale |
| 6,778,706 | B1 | 8/2004 | Kim |
| 6,894,628 | B2 | 5/2005 | Marpe |
| 7,286,710 | B2 | 10/2007 | Marpe |
| 7,881,386 | B2 | 2/2011 | Liang |
| 8,179,974 | B2 * | 5/2012 | Tu et al. .................. 375/240.24 |
| 8,467,448 | B2 * | 6/2013 | Hsiang et al. ........... 375/240.03 |
| 2002/0009146 | A1 | 1/2002 | Hall |
| 2003/0053543 | A1 | 3/2003 | Bhaumik |
| 2003/0219160 | A1 | 11/2003 | Song |
| 2004/0146108 | A1 | 7/2004 | Hsia |
| 2004/0252759 | A1 * | 12/2004 | Winder et al. ........... 375/240.12 |
| 2005/0179572 | A1 | 8/2005 | Winger |
| 2006/0146931 | A1 | 7/2006 | Boyce |
| 2006/0262852 | A1 | 11/2006 | Cai |
| 2007/0030903 | A1 | 2/2007 | Cote |
| 2007/0121719 | A1 | 5/2007 | Van Der Schaar |
| 2007/0133690 | A1 * | 6/2007 | Xin et al. ................. 375/240.24 |
| 2007/0280349 | A1 | 12/2007 | Prieto |
| 2008/0107185 | A1 * | 5/2008 | Lefol et al. .............. 375/240.25 |
| 2009/0016439 | A1 | 1/2009 | Thoreau |

FOREIGN PATENT DOCUMENTS

| | | |
|---|---|---|
| EP | 1691559 | 8/2006 |
| EP | 1711018 | 10/2006 |
| EP | 1727372 | 11/2006 |
| GB | 2417630 | 3/2006 |
| JP | 2008011431 | 1/2008 |
| KR | 20060121801 | 11/2006 |
| WO | 9638006 | 11/1996 |
| WO | 9922365 | 5/1999 |
| WO | 9963760 | 12/1999 |
| WO | 0235849 | 5/2002 |
| WO | 03055227 | 7/2003 |
| WO | 2004080050 | 9/2004 |
| WO | 2005099276 | 10/2005 |
| WO | 2006044370 | 4/2006 |
| WO | 2006052399 | 5/2006 |
| WO | 2006113019 | 10/2006 |
| WO | 2007064347 | 6/2007 |
| WO | 2007089696 | 8/2007 |

OTHER PUBLICATIONS

Sullivan, et al., "Text of ISO/IEC 14496 10 Advanced Video Coding 3rd Edition" ISO/IEC JTC 1, Jul. 4, 2004.

Wiegand, et al., "Overview of the H264/AVC Video Coding Standard" IEEE Transactions on Circuits and Systems for Video Technology, vol. 13, No. 7, pp. 560-576, Jul. 2003.

Richardson, Iain E.G., "H.264 and MPEG-4 Video Compression" Video Coding for Next-generation Multimedia, John Wiley & sons, New York, Nov. 2003, 280 pages.

Wang, et al., "A Fast Mode Decision Algorithm and Its VLSI Design for H.264/AVC Intra-Prediction", IEEE Transactions on Circuits and Systems for Video Technology, vol. 17, No. 10, pp. 1414-1422, Oct. 2007.

Pan, et al., "Fast Mode Decision Algorithm for Intrapediction in H264/AVC Video Coding" IEEE Transactions on Circuits and Systems for Video Technology, vol. 15, No. 7, pp. 813-822, Jul. 2005.

Yin, et al., "Fast Mode Decision and Motion Estimation for JVT/H264" Proceedings of the IEEE International Conference on Image Processing, Sep. 2003, pp. 853-856.

Choi, et al., "Fast Coding Mode Selection With Rate-Distortion Optimization for MPEG-4 Part 10-AVC/H.264" IEEE Transactions on Circuits and Systems for Video Technology, vol. 16, No. 12, pp. 1557-1561, Dec. 2006.

Kim, et al., "Multistage Mode Decision for Intra Prediction in H.264 Coded", Proceedings of the Conference on Visual Communications and Image Processing 2004, San Jose, CA Jan. 20-22, 2004, vol. 5308, No. 1, Jan. 20, 2004, pp. 355-363.

Pickering, et al., "A VBR Rate Control Algorithm for MPEG-2 Video Coders with Perceptually Adaptive Quantisation and Traffic Shaping" Signal Processing, Image Communication, Amsterdam NL, vol. 11, No. 1, Nov. 1, 1997, pp. 1-19.

Lin, et al., "Bit-Rate Control Using Piecewise Approximated Rate-Distortion Characteristics" IEEE Transactions on Circuits and Systems for Video Technology, IEEE Service Center, Piscataway, NJ, USA., vol. 8, No. 4, Aug. 1, 1998.

Fluery, et al., "Neural Network Based Image Coding Quality Prediction" Acoustics, Speech, and Signal Processing, Munich, Germany, Apr. 1997 pp. 3413-3416, vol. 4.

Liu, et al., Region-of-Interest Based Resource Allocation for Conversational Video Communication of H.264/AVC, IEEE Transactions on Circuits and Systems for Video Technology, Jan. 2008, pp. 134-139, vol. 18.

Kim, et al., "A Fast Intra-Mode Decision Algorithm for P-Slices in H.264/AVC Video Coding" International Conference on Consumer Electronics, Las Vegas, NV, Issue date: Jan. 10-14, 2007, p. 1-2.

Wu, et al., "Block Inter Mode Decision for Fast Encoding of H.264" IEEE International Conference on Acoustics, Speech, and Signal Processing, 2004 Proceedings, May 17-21, 2004, pp. 184-4, vol. 3.

Xiao, et al., "A Optimized Context-Based Adaptive Binary Arithmetic Coding Algorithm in Progressive H.264 Encoder" Proc. SPIE 6246, on Apr. 18, 2006, in Orlando, FL, USA.

Heng, et al., "End-to-End Rate-Distortion Optimized MD Mode Selection for Multiple Description Video Coding" EURASIP Journal on Applied signal Processing, vol. 2006, 12 pages.

Wagner, et al., "Video Coding with Quad-Trees and Adaptive Vector Quantization" in Proc. of European Signal Processing Conference.

Wiegand, et al., "Rate-Distortion Optimized Mode Selection for Very Low Bit Rate Video Coding and the Emerging H.263 Standard" IEEE Transactions on Circuits and Systems for Video Technology, issue on Apr. 1996, vol. 6, Issue 2, pp. 182-190.

Bin, et al., "Fast Adaptive Mode Decision Algorithm for H.264 Based on Spatial Correlation" Journal on Communications, vol. 27, No. 1, Jan. 2006.

Lu, Ligang, "Advances in Tree-Structured Vector Quantization and Adaptive Video Coding" vol. 5611B of Dissertations Abstracts International, Dialog File 35, vol. 5611B.

Lim, et al., "A Pentagonal Fast Block Matching Algorithm for Motion Estimation Using Adaptive Search Range" IEEE International Conference on Acoustics, Speech, and Signal Processing, 2003 Proceedings, Apr. 6-10, 2003, pp. 669-672, vol. 3.

Guillotel, et al., "Adaptive Encoders: The New Generation of MPEG-2 Encoders" SMPTE Journal Apr. 2000, pp. 287-294.

Andreopoulos, et al., "Adaptive Linear Prediction for Resource Estimation of Video Decoding" IEEE Transactions on Circuits and Systems for Video Technoogy Issue Date Jun. 2007, vol. 17, Issue 6, pp. 751-764.

Lee, et al., "Adaptive Frame Type Selection for Low Bit-Rate Video Coding" Proc. SPIE, 2308, conference on Sep. 29, 1994, in Chicago, IL, USA.

Sun, et al., "Perceptually Adaptive Rate-Distortion Optimization for Variable Block Size Motion Alignment in 3D Wavelet Coding" IEEE International Conference on Acoustics, Speech, and Signal Processing, 2005. vol. 2, published on Mar. 18-23, 2005.

(56) References Cited

OTHER PUBLICATIONS

Xie, et al., "Simple and Efficient Rate Control for H.264/AVC" International Symposium on Intelligent Signal Processing and Communication Systems, 2007. Issued on Nov. 28-Dec. 1, 2007, pp. 862-865.

Sullivan, et al., "Rate-Distortion Optimization for Video Compression" IEEE Signal Processing Magazine, vol. 15, pp. 74-90, Nov. 1998.

He, et al., "Efficient Coding with Adaptive Motion Models" Picture Coding Symposium, published on 2003, pp. 149-153.

* cited by examiner

COMPLEXITY ALLOCATION FOR VIDEO AND IMAGE CODING APPLICATIONS

CROSS-REFERENCE TO RELATED APPLICATIONS

This application claims priority to U.S. Patent Provisional Application No. 61/100,681, filed 26 Sep. 2008, hereby incorporated by reference in its entirety.

TECHNOLOGY

This disclosure relates generally to video technology, and more particularly, to video coding.

BACKGROUND

As used herein, the term "image feature" may refer to one or more picture elements (e.g., one or more pixels) within a field. As used herein, the term "source field" may refer to a field from which information relating to an image feature may be determined or derived. As used herein, the term "intermediate field" may refer to a field, which may temporally follow or lead a source field in a video sequence, in which information relating to an image feature may be described with reference to the source field. As used herein, the term "disparity estimation" may refer to techniques for computing motion vectors or other parametric values with which motion, e.g., between two or more fields of a video sequence, or other differences between an image, region of an image, block, or pixel and a prediction signal may efficiently be predicted, modeled or described. An example of disparity estimation can be motion estimation. As used herein, the term "disparity estimate" may refer to a motion vector or another estimated parametric prediction related value. As used herein, the term "disparity compensation" may refer to techniques with which a motion estimate or another parameter may be used to compute a spatial shift in the location of an image feature in a source field to describe the motion or some parameter of the image feature in one or more intermediate fields of a video sequence. An example of disparity compensation can be motion compensation. The above terms may also be used in conjunction with other video coding concepts (e.g., intra prediction and illumination compensation).

BRIEF DESCRIPTION OF DRAWINGS

Like reference numbers and designations in the various drawings can indicate like elements.

DESCRIPTION OF EXAMPLE EMBODIMENTS

Figure 1A:
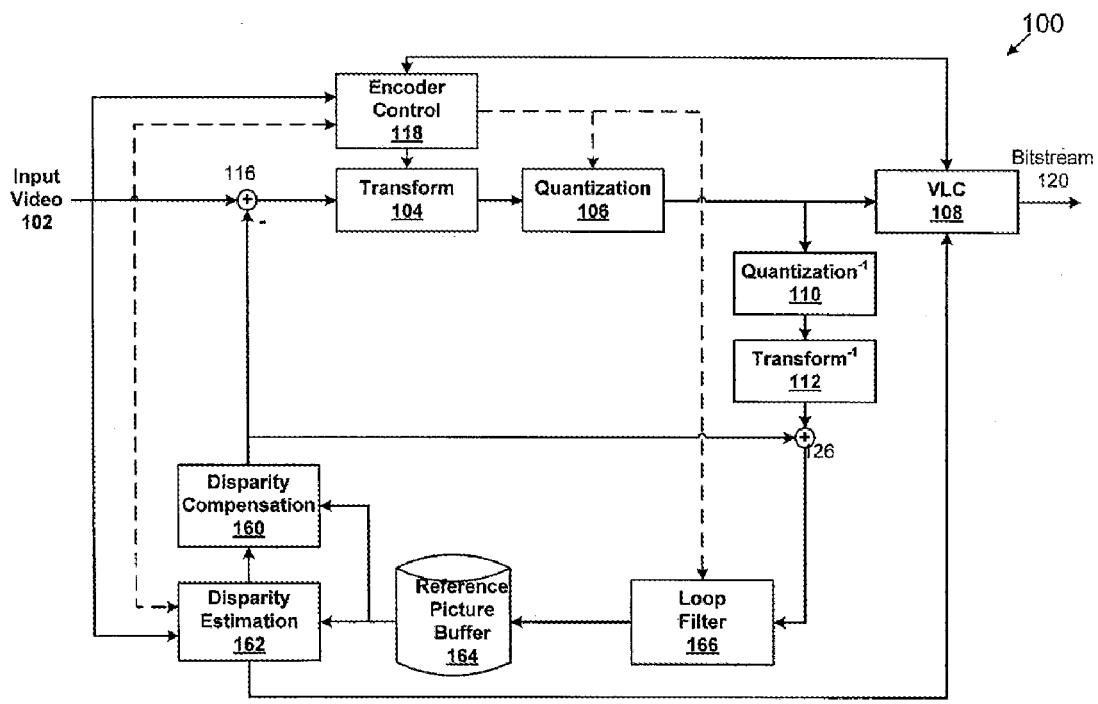
FIG. 1A depicts a diagram of an example of a video encoder.

Example embodiments relating to video compression and video coding are described herein. In the following description, for the purposes of explanation, numerous specific details are set forth in order to provide a thorough understanding of the present invention. It will be apparent, however, that embodiments of the present invention may be practiced without these specific details. In other instances, well-known structures and devices are shown in block diagram form in order to avoid unnecessarily obscuring the present invention. The details of one or more embodiments are set forth in the accompanying drawings and the description below. Other features, objects, and aspects are apparent from the description and drawings, and from the claims.

Overview

Some embodiments of the disclosed techniques involve a method of coding video. The method involves assigning one or more coding method types of complexity to video for any one of or any combination of coding decision levels associated with a sequence of pictures, a group of pictures (GOP), at least one of the pictures, a scene of the sequence of pictures, a region of the scene or the at least one picture, a block, or a macroblock. The method involves coding a number of coding units as a function of complexity and the one or more coding method types determined from one or more of the coding decision levels. A first coding decision level is associated with determining a first complexity and a first coding method type for the sequence of pictures. A second coding decision level is associated with determining a second complexity and a second coding method type for at least one of the pictures or the scene of the sequence of pictures. At least one picture or the sequence of pictures includes the coding units. A third coding decision level is associated with determining a third complexity and a third coding method type for the coding units.

These and other embodiments can optionally include one or more of the following features. The coding units can include a macroblock of pixels or a sequence of macroblocks for an area, in which the sequence of macroblocks can correspond to a coding slice, a rate control unit, and/or a pattern corresponding to an object region. The method can involve assigning a number of hierarchical levels of coding decision levels. The number of hierarchical levels can be selected adaptively. The number of hierarchical levels can be selected by a video system user. The first coding decision level can include a sequence coding level, the second coding decision level can include a picture coding level or a scene coding level, and the third coding decision level can include a coding unit coding level. The method may involve, in the first coding decision level, allocating a number of coding parameters. The allocation of the coding parameters can involve allocating a pattern decision parameter for complexity allocation at the sequence coding level, allocating a scene parameter to indicate if scene analysis is used during any of the determinations, and/or allocating a map parameter to indicate a map pattern. The method can involve, in the first coding decision level, allocating any of the parameters by a user, or allocating any of the parameters using one or more statistics to allocate the one or more parameters. The allocation of any of the parameters using one or more statistics can include utilizing statistics on the sequence to invoke one or more pattern maps using one or more of the coding method types. The method can include, in the first coding decision level, selecting at least one of the coding method types based on the one or more allocated parameters, in which any of the coding method types can include a fixed assignment coding method, a random assignment coding method, or an adaptive assignment coding method. At least one of the parameters can indicate whether every picture in the sequence is to be coded with a same coding method type. Any of the coding method types can include intra coding modes, inter coding modes, or a combination of inter and intra coding modes. Any of the coding method types can include one or more statistical characteristics of an encoder or decoder. The method can include allocating one or more complexity levels to one or more spatial areas. For the first coding decision level, the adaptive assignment coding method can use one or more coding method types and one or more coding patterns for one or more pictures in the sequence or a scene of the sequence. The adaptive assignment coding method may be based, at least in part, on a characteristic of an image, a slice type, a prediction mode, a brightness level, a variance, an object analysis, motion, a picture distance from a last scene change, a scene analysis, and/or one or more characteristics of the encoder. The method can involve, in the first coding decision level, determining if scene analysis is enabled or disabled. If scene analysis is disabled, the second coding decision level can use picture-level complexity allocation. If scene analysis is enabled, the second coding decision level can use scene-level complexity allocation. The scene-level complexity allocation can include the picture-level complexity allocation. The scene-level complexity allocation can include classifying one or more transitions in the sequence. The one or more transitions can include scene changes, fade-ins, fade-outs, or cross-fading. The scene-level complexity allocation can also include assigning one or more coding method types to different scenes. In the second coding decision level, the method can involve determining whether the one or more parameters from the first coding decision level are to be used in the second coding decision level. If one or more parameters from the first coding decision level are determined to be used in the second coding decision level, the method can involve copying one or more parameters from the first coding decision level in the second coding decision level. In the second coding decision level, the method can involve selecting at least one of the coding method types for at least one of the pictures or the scene of the sequence of pictures based on the one or more allocated parameters. The method can involve selecting the random assignment coding method for at least one of the pictures or the scene of the sequence of pictures, the random assignment coding method can include randomly encoding the coding units in the picture or scene. The random assignment coding method for the picture or scene can include assigning randomly-generated numbers to the coding units using rate distortion optimization (RDO) complexity levels corresponding to the randomly-generated numbers. The random assignment coding method for the picture or scene can also include classifying the complexity using an estimate or a value of a system metric, in which the system metric can include an evaluation of the complexity with an amount of memory, a number of required operations, a required amount of time, and/or a required number of cycles. The randomly-generated numbers can be based on a probability or a distribution. The method can involve selecting the fixed assignment coding method for at least one of the pictures or the scene of the sequence of pictures, in which the fixed assignment coding method can involve encoding the coding units in the picture or scene. The fixed assignment coding method can include using a fixed coding pattern for the picture or scene. The fixed coding pattern can include a column-wise pattern, a checker-board pattern, a scan-order pattern, a spiral pattern, a zig-zag pattern, an irregular pattern, a pattern with a number of complexity levels, a pattern with random complexity levels, a user-defined pattern, a system-defined pattern, or any combination of the patterns. The method can include selecting the adaptive assignment coding method for at least one of the pictures or the scene of the sequence of pictures. The adaptive assignment coding method can include encoding the coding units in the picture or the scene with the adaptive assignment coding method. The adaptive assignment coding method can include one or more combinations or variations of the coding method types. The adaptive assignment coding method for at least one of the pictures or the scene of the sequence of pictures can include performing segmentation for the scene or picture. The segmentation can involve performing differentiation of regions with one or more characteristics, and/or assigning one or more coding patterns to one or more regions. The adaptive assignment coding method can involve performing region-based coding for the one or more regions. The coding of the coding units as the function of complexity and the one or more coding method types determined from one or more of the coding decision levels can involve determining whether one or more parameters from the first or second coding decision levels are to be used in the third coding decision level, and if one or more parameters from the first or second coding decision levels are determined to be used in the first or second coding decision levels, the method can involve copying the one or more parameters from the first or second coding decision levels in the first or second coding decision levels. The method can include, in the third coding decision level, allocating any of the parameters by the user, allocating any of the parameters by a system, or allocating any of the parameters using one or more statistics. In the third coding decision level, the method can involve selecting at least one of the coding method types based on the one or more allocated parameters. In third coding level, the method can involve determining a number of candidate coding methods associated with at least one of the complexity levels. The determination of the candidate coding methods can involve associating at least one of the complexity levels based on the one or more characteristics of the encoder, in which the one or more characteristics can include a power consumption budget. The method can involve assigning the complexity levels to a number of spatial areas, and maintaining a targeted complexity budget. The method can involve generating at least one of the parameters by at least one of the candidate coding methods for each of the coding units based on a complexity budget. The candidate coding methods can be associated with a coding performance metric. In the third coding decision level, the method can include, in the random assignment coding method, randomly-generating numbers to map to categories, and assigning the categories with the coding units. The assignment of the categories can correspond with the complexity levels. In the third coding decision level, the method can involve, in the fixed assignment coding method, encoding the coding units with the fixed assignment coding method. The fixed assignment coding method for the third coding decision level can include using the fixed coding pattern, in which the fixed coding pattern for the third coding decision level can include a column-wise pattern, a checker-board pattern, a scan-order pattern, a spiral pattern, a zig-zag pattern, an irregular pattern, a pattern with a number of complexity levels, a pattern with random complexity levels, a user-defined pattern, a system-defined pattern, or any combination of the patterns. The one or more features of any of the coding units can include a DC value, a variance, texture information, edge information, a comparison of variances between at least two areas, a ranking of coding units with a plurality of variances, a segmentation method, a smoothness of one or more areas, category assignments, or any combination of features. The segmentation method can include any of an object segmentation method, a clustering method, an edge-detection method, a region growing method, and/or a level set method. In the third coding decision level, the method can include, in the adaptive assignment coding method, performing context analysis by analyzing a context or the scene for the coding units to determine the complexity levels. The complexity levels can be determined adaptively as a factor of one or more coding characteristics. The one or more coding characteristics can include an area, a complexity budget, a quality budget, one or more features of any of the coding units, one or more locations of the coding unit, and/or any combination of the coding characteristics. The one or more coding characteristics for the one or more locations of the coding unit can include a boundary coding unit, an internal coding unit, a region of interest (ROI) in a picture, spatial neighboring characteristics, temporal neighboring characteristics, stored context analysis results, and/or any combination of the one or more coding characteristics. The method can involve using a level of complexity with rate distortion optimization (RDO). The level of complexity can include low complexity RDO, high complexity RDO, RDO with mode skipping, RDO with early termination, or any combination of RDO methods. The low complexity RDO can involve low complexity RDO with H.264/MPEG-4, and the high complexity RDO can involve high complexity RDO with video compression. The method can involve using intra coding in I, P, or B slices in any combination. The method can involve using quantization parameters (QPs) for encoding. The method can involve an encoder and/or a decoder.

Any of the methods and techniques described herein can also be implemented in a system with one or more components, an apparatus or device, a machine, a computer program product, in software, in hardware, a codec, or in any combination thereof. For example, the computer program product can be tangibly encoded on a computer-readable medium, and can include instructions to cause a data processing apparatus (e.g., a data processor) to perform one or more operations for any of the methods described herein. To illustrate how these techniques can be implemented, several example embodiments are depicted and described.

Coding Systems and Techniques

Video compression systems and standards (e.g., ISO MPEG-1, MPEG-2, MPEG-4 Simple (SP) and Advanced Simple (ASP) profiles, MPEG-4 AVC/ITU-T H.264, H.261, H.263, VC-1, and the like.) including scalable (e.g., SVC) and stereo or multiview coding systems (e.g., MVC), can provide an approach to store and deliver video content at a reasonable cost.

Video coding optimization can be a component of video compression systems. Video coding optimization can provide high coding efficiency with a quality visual experience. Video coding optimization may consider rate/distortion optimization, which allows joint optimization of both bit rate and distortion for decision making. Alternatively, optimizing may consider distortion or bit rate individually. Optimization may also consider parameters including decoder and/or encoder complexity, which may relate to computation resource availability (e.g., memory state and capacity, power consumption) and implementation costs, among others. For example, Rate distortion optimization (RDO) can be used to achieve high coding efficiency and visual quality in modern video coding systems.

FIG. 1A depicts a diagram of an example of a video encoder 100. The encoder 100, for example, may be an encoder substantially compliant with the MPEG-4 AVC video coding standard also referred to as MPEG-4 part 10 or ITU-T H.264. In encoder 100, the input video 102 is sent to an adder 116 that subtracts the output of a disparity compensation component 160 (e.g., motion/illumination change compensation and/or intra-mode compensation) from the input video frame 102. The output of the disparity compensation component 160 may also be referred to as a prediction signal. The output from the adder 116 is coupled to a transform component 104, followed by a quantization component 106. Outputs of an encoder control component 118 are coupled to the quantization component 106 and a loop filter 166. The output of the quantization component 106 is coupled to a variable length coding (VLC) component 108 and an inverse quantization component 110. The VLC component 108 may use entropy coding methods, such as Universal Variable Length Coding (UVLC), Context Adaptive Variable Length Coding (CAVLC), or Context Adaptive Binary Arithmetic Coding (CABAC), among others. The bit stream 120 results from the VLC component 108. The VLC is coupled to and receives inputs from the quantization component 106, and the encoder control component 118, and a disparity estimation component 162. The inverse quantization component 110 is coupled to an inverse transform component 112. Information about the encoding process, such as the number of bits required to encode a block, region, or image, and the distortion introduced by such decision, are sent to the loop filter 166 and other components.

The disparity compensation component 160 can generate a prediction signal given information/decisions from the disparity estimation component 162. The disparity estimation component 162 can perform tasks that may include: (a) determining the appropriate prediction parameters such as motion vectors, illumination change parameters, and/or intra prediction modes, (b) selectively enabling and disabling motion-compensation block-sizes; (c) using certain pictures as motion-compensation references; (d) adjusting the motion estimation search range, refinement patterns, and/or the number of motion estimation iterations; and (e) limiting the number of coding modes to be tested given some predefined conditions or information about the image, among others.

The loop filter component 166 can perform tasks that may include: (a) adjusting the parameters of the in-loop deblocking filter; (b) switching-off the deblocking filter, among others. The inverse transform component 112 receives an input from the inverse quantization component 110 and sends an output to an adder 126. The adder 126 receives the signal from the inverse transform component 112 and the disparity compensation component 160, and sends a summed signal to the loop filter 166. The reference picture buffer 164 receives an input from the loop filter 166, and sends an output to the disparity compensation component 160 and the disparity estimation component 162. The disparity estimation component 162 also receives a rate control input from the encoder control component 118. The loop filter 166 also may receive the rate control input. The input video 102 is sent to the adder 116, the encoder control component 118, and the disparity estimation component 162. The disparity estimation component 162 receives the input video 102, the output from the encoder control 118, and the output of the reference picture buffer 164.

Figure 1B:
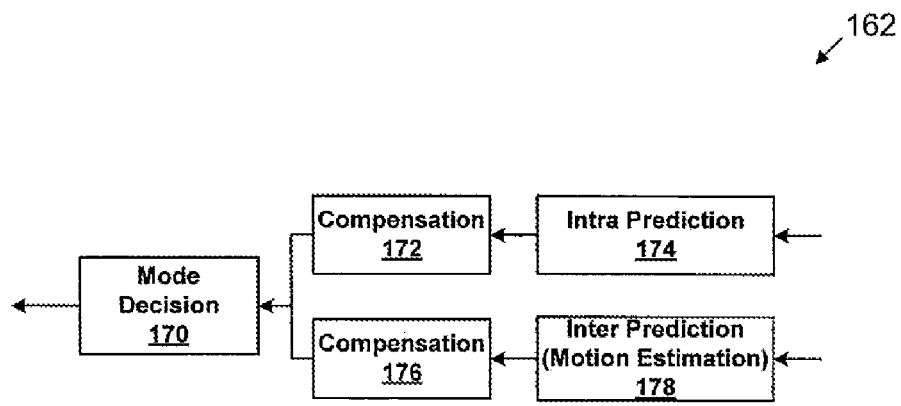
FIG. 1B depicts a diagram of an example of a disparity estimation component.

FIG. 1B depicts a diagram of an example of the disparity estimation component 162. Both the intra prediction component 174 and the inter prediction component 178 can be used to determine the appropriate prediction parameters. The compensation components 172, 176 can then generate the prediction signal given the outputs from intra prediction and inter prediction components 174, 178. Finally, the mode decision component 170 can perform the processes to determine the appropriate intra prediction and/or inter prediction modes (e.g., select either an intra mode or an inter mode). The disparity estimation component 162 may compute rate distortion optimization information and may make encoding decisions (e.g., driving the disparity compensation process). Disparity estimation can be characterized by a balance between minimizing the prediction error (e.g., motion compensated with or without weighted prediction error, intra prediction error, etc.), while maximizing the coherence of the prediction parameter field (e.g., weighting parameters, motion vectors, etc.). The coherence of the motion field can be expressed in terms of the motion field's smoothness.

Figure 2:
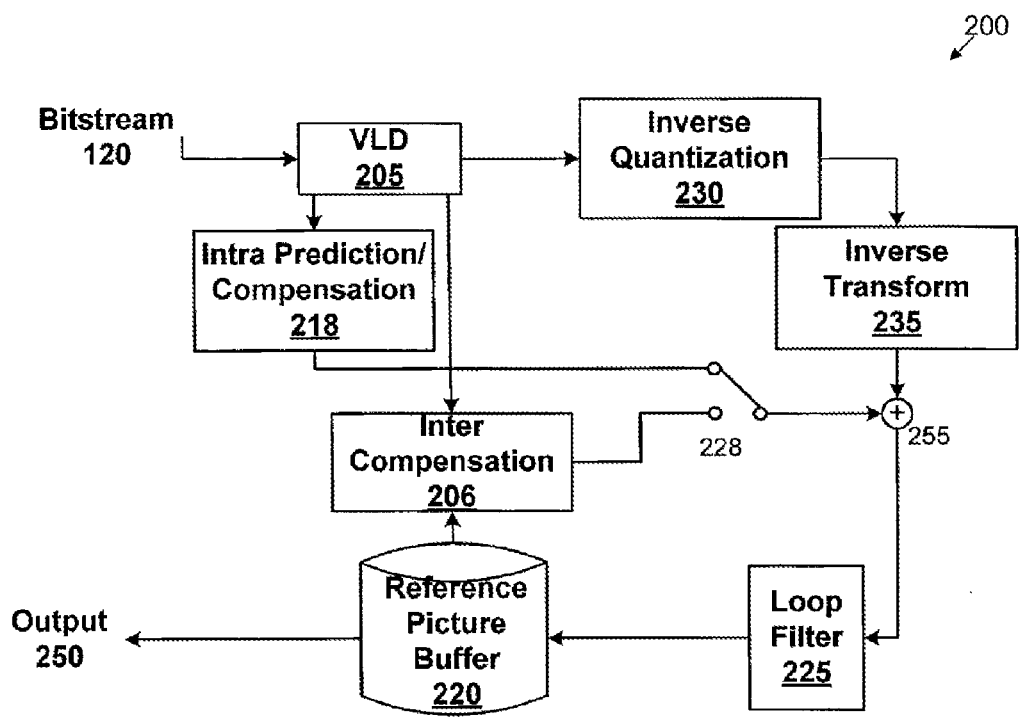
FIG. 2 depicts a diagram of an example of a video decoder.

FIG. 2 depicts a diagram of an example of a video decoder 200. In some embodiments, the decoder 200 may function in substantial conformity with the H.264/AVC standard. The decoder 200 receives the bit stream 120, and decodes the bit stream using an entropy (variable length) decoder (VLD) 205, one or multiple inverse quantizers 230, one or multiple inverse transform components 235, an intra prediction/compensation component 218, and an inter compensation component 206. The VLD 205 may extract both header information, including disparity information such as modes, motion vectors, illumination change parameters, intra prediction modes, among others, and quantized and transformed residual data. The entropy decoder can use UVLC, CAVLC, and CABAC, among others. Disparity compensation, and more specifically prediction of the signal, is performed in the intra prediction/compensation component 218 and/or the inter compensation component 206 using the header information, while the residual data are first dequantized using the inverse quantizer 230 and then inverse transformed using the inverse transform component 235. A switch 228 sends the output of either the intra prediction/compensation component 218 or the inter compensation component 206 to an adder 255. The adder 255 adds the output of the inverse transform 235 and the output of either the intra prediction/compensation component 218 or the inter compensation component 206, and sends the summed result to a loop filter 225. The output of the loop filter 225 is coupled to a reference picture buffer 220, which can be used for storing pictures for reference and delivering an output 250. The inter compensation component 206 also receives inputs from the VLD 205 and the reference picture buffer 220.

In video coding systems, intra and inter coding are used to achieve compression. Motion-compensated prediction (MCP) can be used for inter coding in order to exploit the correlation that may exist between adjacent pictures (e.g., temporal neighbors) within a scene. Intra coding may consider the spatial neighborhood for the prediction of the current block or region. Apart from coding an image using intra prediction at the start of the encoding process or during scene changes, intra prediction can also be used for other types of scene transitions (e.g., cross-fades and pans), or in the presence of occluded areas or an appearance of new objects.

Intra Coding Modes and Mode Selection

Figure 3:
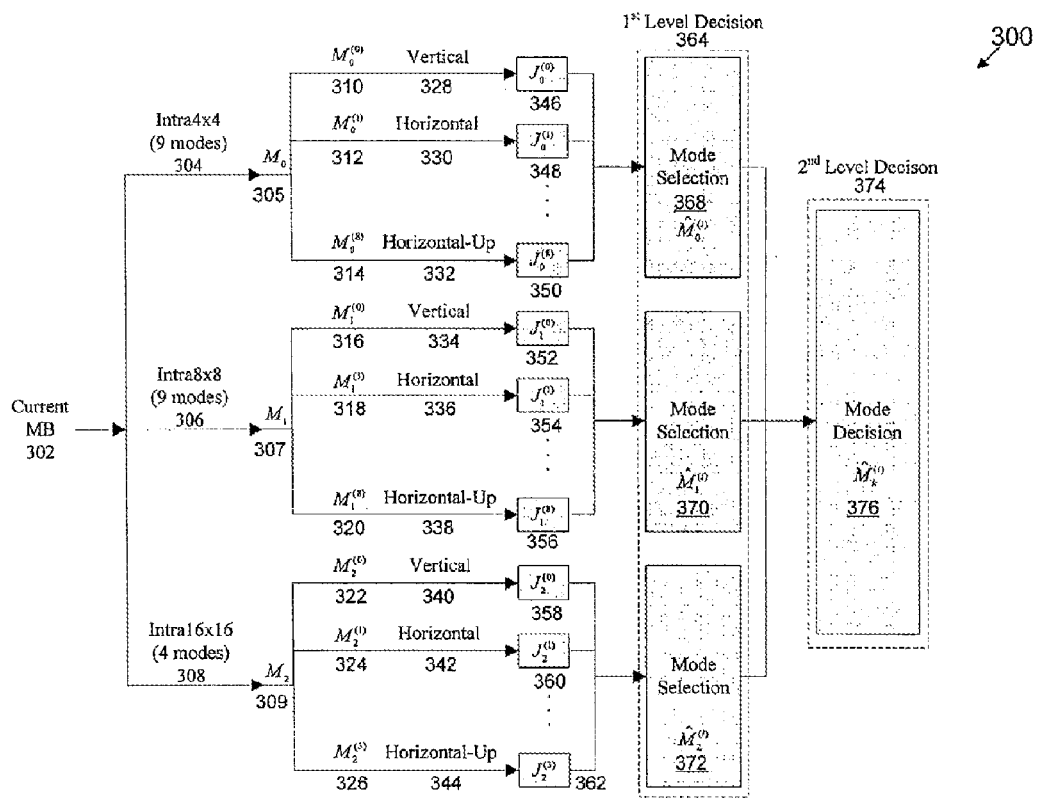
FIG. 3 depicts a diagram of an example of a video coding scheme employing intra mode decision.

FIG. 3 depicts a diagram of an example of a video coding optimization scheme 300 employing intra mode decision. Scheme 300 may be used, for example, in the H.264 video coding standard for luma coding. Several block sizes may be available, such as 4×4 (Intra4×4 $M_0$), 8×8 (Intra8×8 $M_1$) or 16×16 (Intra16×16 $M_2$). In scheme 300, for every $M_k$ (k=0, 1, 2) 305-309, several prediction modes $M_k^{(i)}$ are available for a current macroblock 302. For example, in the context of MPEG-4 AVC, Intra4×4 and Intra8×8 block types 304, 306 can have nine prediction modes (i=0, 1, . . . , 8 for k=0, 1) 310-318, while the Intra16×16 block type 308 can have four prediction modes (i=0, 1, . . . , 3 for k=2) 322-326. The prediction modes may be of various types, such as vertical 328, 334, 340, horizontal 330, 336, 342, or horizontal-up 332, 338, 344. Each prediction mode may have a corresponding cost function, such as a Lagrangian cost function $J_i^{(k)}$ 346-362.

An encoder, such as encoder 100 of FIG. 1A, may perform a search to determine the best intra prediction mode $\hat{M}_0^{(i)}, \hat{M}_1^{(i)}, \hat{M}_2^{(i)}$ 368-372 for every available prediction block type $M_k$, in which the best intra prediction mode can be an intra prediction mode that is determined using a first level decision 364 given a certain criterion $J_i^{(k)}$, followed by employing a selection level decision 374. The second level decision 374 does not need to use the same criterion as the first level decision 364. Based on the level decisions 364, 374, the best mode $\hat{M}_k^{(i)}$ 376 from candidate modes can be selected.

In other embodiments, similar considerations may apply to chroma even if different modes are considered. Again in the example context of MPEG-4 AVC, for 4:2:0 and 4:2:2 coding, the available modes may be very similar, but not fully identical to those of the Intra16×16 mode for luma. For 4:4:4 coding, the same modes and block types may also be available for chroma prediction and coding.

Figure 4A:
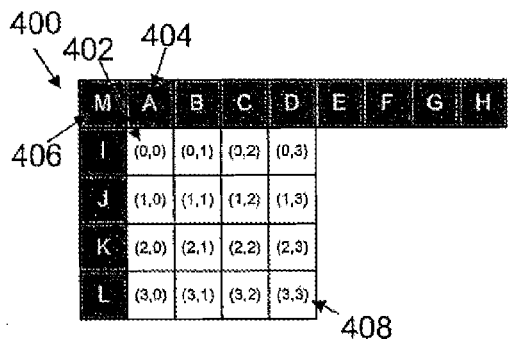
FIGS. 4A-C depict examples of samples used for intra mode prediction.
Figure 4B:
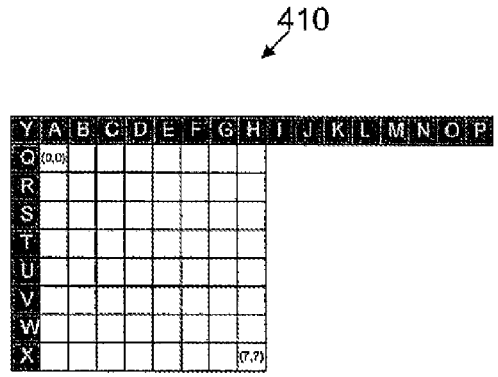
Figure 4C:
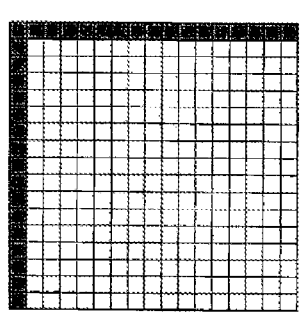

FIGS. 4A-C depict examples of samples 400, 410, 420 used for intra mode prediction. FIG. 4A depicts examples of samples 400 used for Intra4×4 mode prediction, FIG. 4B depicts examples of samples 410 used for Intra8×8 mode prediction, and FIG. 4C depicts examples of samples 420 used for Intra16×16 mode prediction.

Figure 5:
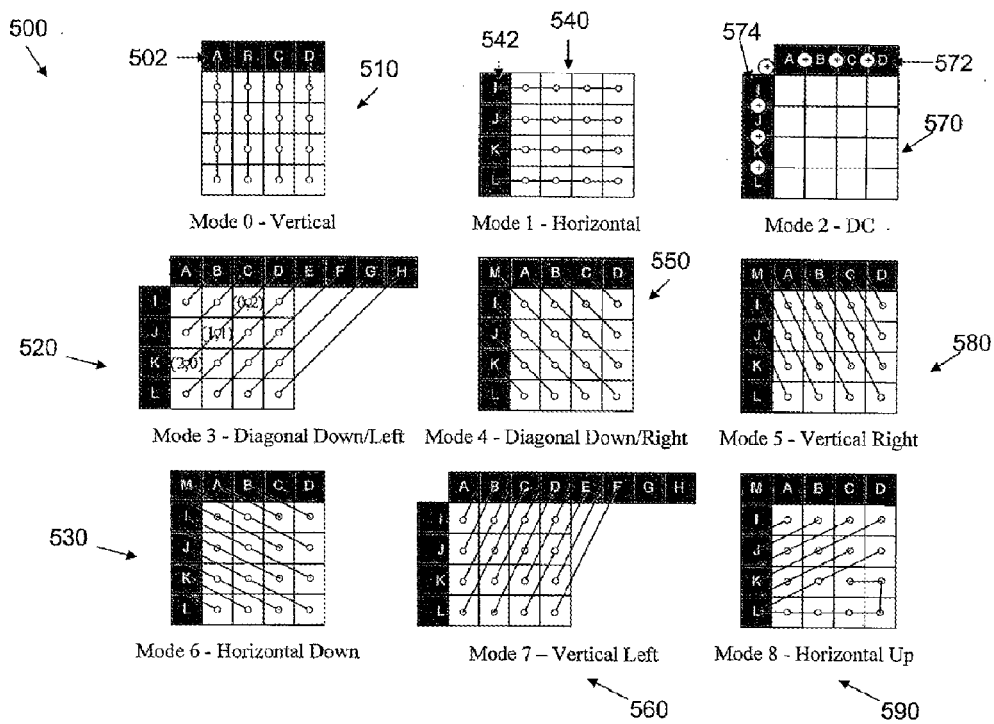
FIG. 5 depicts nine examples of Intra4×4 modes.

In FIG. 4A, the 16 samples 400 at positions from (0,0) 402 to (3,3) 408 can be predicted using the neighboring samples denoted by A 404 through M 406. In MPEG-4 AVC, nine possible prediction directions can be considered for this mode, as illustrated in FIG. 5. In other codecs, more or different modes may be available.

FIG. 5 depicts an example of nine prediction directions that can be used for an Intra4×4 block. In the nine examples of Intra4×4 modes 510-590 shown, the vertical prediction mode 510 (mode 0) utilizes the boundary row 502 (denoted by A through D) from the top 4×4 block and is vertically copied directly as the predictor. Similarly, the horizontal prediction mode 540 (mode 1) uses the boundary column 542 of the left 4×4 block (denoted by I through L) as the predictor. For the DC prediction mode 570 (mode 2), an average of the available adjacent boundary samples from both the top row of blocks 572 (A-D) and the left column of blocks 574 (I-L) are taken as the predictor. The other modes, modes 3-8, are the diagonal prediction modes, including diagonal-down-left prediction mode 520, diagonal-down-right prediction mode 550, the vertical-right prediction mode 580, horizontal-down prediction mode 530, the vertical-left prediction mode 560, and the horizontal-up prediction 590.

As an example, in the diagonal-down-left prediction mode 520 (mode 3), the prediction value of the pixels at positions (0,2), (1,1), and (2,0) can be set to be equal to:

$$PRED = (C + 2D + E + 2) >> 2 \quad (1)$$

For the Intra8×8 block type, the prediction can be very similar to that of Intra4×4, as in FIG. 4A. The prediction may be performed for the entire 8×8 block as shown in FIG. 4B, where samples 410 pixels at positions (0,0) to (7,7) are predicted from the boundary pixels A through Y. For the Intra16×16 block type, as in FIG. 4C, samples 420 for the entire 16×16 macroblock can be predicted using the boundary pixels of the left and top macroblocks. Four prediction modes are supported for the Intra16×16 block type: vertical, horizontal, DC, and plane prediction. The first three prediction modes can be similar to the corresponding prediction modes in Intra4×4. The plane prediction mode can use the linear combinations of the boundary pixels as the predictor. In other codecs, more or different modes may be available.

Figure 6:
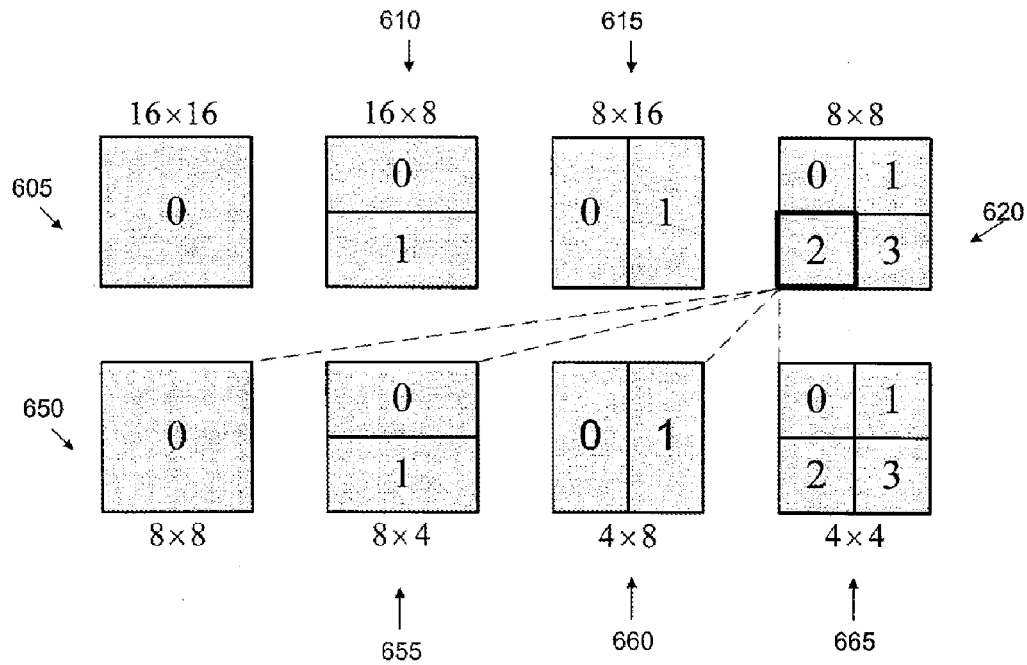
FIG. 6 depicts an example of partitions of a macroblock in inter coding.

FIG. 6 depicts an example of partitions 605-665 of a macroblock in inter coding. In particular, FIG. 6 depicts a 16×16 partition 605, a 16×8 partition 610, an 8×16 partition 61 and an 8×8 partition 620. The index of the block shows the order (e.g., 0, 1, 2, and so on) of the coding process of the partitions of the block. The 8×8 partition 620 includes an 8×8 sub-macroblock 650, an 8×4 sub-macroblock 655, a 4×8 sub-macroblock 660, and a 4×4 sub-macroblock 665.

In many codecs, three different slice types can be used: I slices, P slices, and B slices. An embodiment can use these slice types, but may also use other less common slice types (e.g., SI and SP slices) or proposed slice types (e.g., Multihypothesis Slices, Tweaning based slices etc). The macroblocks in an I slice consider intra prediction methods (e.g., spatial prediction) for coding. Macroblocks in P slices can use, apart from intra prediction, also inter prediction (e.g., temporal prediction). These methods could also include illumination compensation or consider advanced prediction modes. Some macroblocks of the P slice may also be coded using inter prediction with at most one motion compensated prediction signal per prediction block. Inter prediction may be restricted in considering only a single motion vector (e.g., prediction) per partition. B slices are similar to P slices, except that B slices may allow up to two motion vectors (e.g., two hypotheses per partition) for inter prediction. Multi-hypothesis prediction may generally be considered an extension of B slices in that multi-hypothesis prediction can allow up to N hypotheses to be considered for the prediction of a partition. To perform temporal prediction, there may be a requirement that a mechanism exists to estimate disparity vectors (e.g., motion vectors) between the current picture and a set of references.

When an 8×8 macroblock partition is considered (e.g., 8×8 macroblock partition 620 in FIG. 6), additional information can be used to specify whether the macroblock partition is further partitioned to 8×4, 4×8, and/or 4×4 sub-macroblock partitions (e.g., sub-macroblock partitions 650-665 in FIG. 6). The possible partitioning results are shown in FIG. 6, where the index of the block shows the order of the coding process (e.g., index 2 in sub-macroblock partition 665).

The flexibility required in terms of the macroblock coding partitions that could be used, and the types and amounts of references that could be considered for prediction, may lead to extensive motion/disparity estimation and other coding decisions and processing. In I slices, a search among all available intra prediction modes can be performed. In P and B slices, apart from searching through all intra and inter prediction modes, there can also be a comparison of both intra and inter coding modes to determine the best mode. In this context, a "best mode" can be referred to as a mode that may result in a minimum distortion, bit rate, encoder or/and decoder complexity, implementation cost, a joint metric method (e.g., distortion and rate), among others.

Lagrangian Optimization can be used as a video coding optimization technique in video coding systems. Lagrangian Optimization formulates video coding optimization as a minimization of the Lagrangian cost function. Assuming distortion and bit rate are the metrics to minimize, an expression for a mode $\hat{\pi}$ using Lagrangian Optimization is shown as, $$\hat{\pi} = \operatorname*{argmin}_{\pi \in \Pi} J_k^{(i)} = \operatorname*{argmin}_{\pi \in \Pi} \{D_k^{(i)} + \lambda \cdot R_k^{(i)}\}, \quad (2)$$

where $\hat{\pi}$ is the mode with the minimum Lagrangian cost function J(·) under the candidate set $\Pi = \{_k^{(i)}\}$. The Lagrangian cost function J(·) can represent the sum of the distortion $D_k^{(i)}$ and the multiplied rate $R_k^{(i)}$. The distortion metrics can involve the Sum of Absolute Differences (SAD), the Sum of Square Differences (SSD), the Sum of Absolute Transformed Differences (SATD), or some other distortion metric. The Lagrangian parameter λ, which also can be referred to as the Lagrangian multiplier, can be adjusted to balance the tradeoff between the resulting distortion and the needed rate. In an extreme case, when λ=0, the mode decision may be solely based on the distortion. In another extreme case, when λ is arbitrarily large, the mode decision can be mostly based on the rate. The distortion $D_k^{(i)}$ can be an accurately computed distortion, (e.g., given the final decoded samples), or an estimate of the distortion (e.g., given only the prediction samples and ignoring the coding of any residual information). Similarly, the rate $R_k^{(i)}$ can be an estimate given some information about the signal, or can be the exact bit rate cost needed to encode the signal. For the latter, the complete encoding process can be executed for a macroblock, including residual generation, transform, quantization, entropy coding, inverse quantization and inverse transform. If the rate $R_k^{(i)}$ is the exact bit rate cost needed to encode the signal, then there may be higher complexity compared to an estimate-based technique, which could be based on a simple look-up table method.

Video coding optimization may consider rate/distortion optimization, which allows joint optimization of both bit rate and distortion for decision making. Alternatively, optimizing may consider distortion or bit rate individually. Optimization may also consider other parameters including decoder and/or encoder complexity, which may relate to computation resource availability (e.g., memory state and capacity, power consumption).

Two examples of Lagrangian cost functions are shown below. The first example is a low complexity Rate Distortion Optimization (RDO), $$J_k^{(i)} = D_k^{(i)} = D_k^{(i)}(s_n, s_n'). \quad (3)$$

In Equation (3), $\lambda=0$ and the distortion is an estimate of the distortion, where $s_n$ represents the original block, and $s_n'$ represents the prediction block using either spatial or temporal information.

The second example is a high complexity RDO, $$J_k^{(i)} = D_k^{(i)} + \lambda \cdot R_k^{(i)} = D_k^{(i)}(s_n, \hat{s}_n) + \lambda \cdot R_k^{(i)}. \quad (4)$$

The distortion in this scenario is computed given the original block $s_n$ and the final reconstructed block $\hat{s}_n$ after full encoding. The process to generate the reconstructed block $\hat{s}_n$ can include the following steps. First, the prediction block $s_n'$ can be generated. Then, the residue between the original block and the prediction block $s_n - s_n'$ is transformed, quantized with a quantization parameter (QP), and then entropy coded. The inverse process, which may be performed without having to perform entropy decoding, then can be applied to reconstruct the block $\hat{s}_n$. The transform coefficients from the residue can be used to calculate the real rate $R_k^{(i)}$. The Lagrangian parameter $\lambda$ can be used to weigh the rate. The value of $\lambda$ may depend on the quantization parameter and other content characteristics (e.g., bit-depth, brightness, frame-rate, or complexity).

The various ways to compute the distortion and the rate may result in encoding solutions with different computational complexity and coding performance tradeoffs. High encoder complexity may imply longer encoding time, which may be forbidden for some applications. Furthermore, in some cases, higher complexity may not always result in better performance. For example, it may be possible that the high and low complexity RDO methods discussed above may result in exactly the same coding decision, even though the high complexity method may use considerably higher computational resources and possibly time to execute when compared to the low complexity method.

For every available RDO mode decision method, the encoder may be implemented to select the best mode from a set of candidate modes for the current sample component, whether a luma or a chroma component. The consideration of both chroma and luma components may suggest that an overall encoding complexity is higher.

Several fast intra or inter mode decision methods may be employed to speed up the process of encoding. One basic concept for these mode decision methods can involve analyzing the video content and skipping certain modes during the search that are statistically less likely to be the best mode. In one example, the edge direction of a macroblock can be first computed. This edge direction, along with its nearest neighboring macroblocks' directions and a default direction (e.g., the DC prediction mode), may be used in the candidate set in the first level intra mode decision. This process can be performed separately for each prediction block size. In another example, the modes of the neighboring macroblocks can be used to predict the mode of the current block. The assumption for this example can assume the modes of the spatially adjacent blocks have high correlation. In an example scheme that jointly optimizes motion estimation and mode decision, the motion estimation for some block types can be skipped under some conditions. In another example scheme, an early skip mode decision and a selective intra mode decision can be used to reduce coding complexity.

Complexity-Scalable Coding Mode Decisions

The following describes several complexity-scalable coding mode decision schemes. These decision schemes may include intra and/or inter coding modes, and can employ the statistical characteristics of one or more sources. Some embodiments of the methods herein can allocate different complexity levels to different spatial areas based on their characteristics, and may also include variations of performing mode decision by considering a subset of all available modes for each block. In some embodiments, it is assumed that a video sequence includes several pictures where every picture may be divided into several coding units (CUs).

Some embodiments can provide a mixture of complexity schemes (e.g., high complexity, low complexity, and various versions of those complexities) to provide efficient and accurate results when coding. For instance, the high complexity schemes may be more akin to brute force techniques to provide comprehensive analysis and results during coding. In one example, the high complexity schemes can compute everything needed to decide all of the modes, all of the residuals, as well as the coding of all of the residuals, etc. The low complexity schemes may be used for more simplified processes, such as only examining prediction, or deciding a subset of modes that would be in the high complexity modes, etc. Some embodiments can employ various complexity schemes and determine the tradeoffs in the complexity schemes for efficient performance. For example, some embodiments can conserve computational resources and processing time while providing quality coding results.

Figure 7:
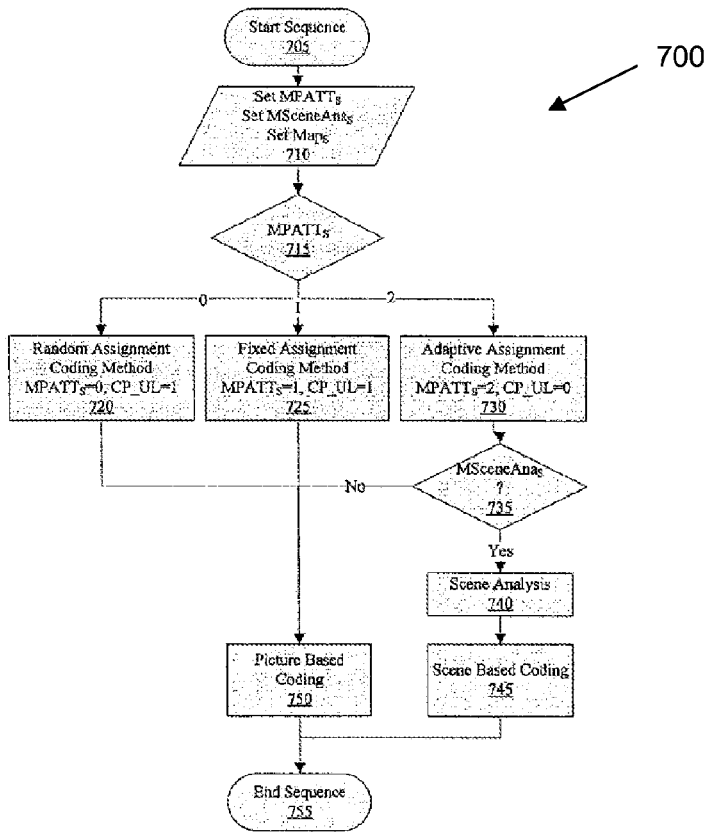
FIG. 7 depicts an example of a complexity allocation scheme at the sequence level.
Figure 8:
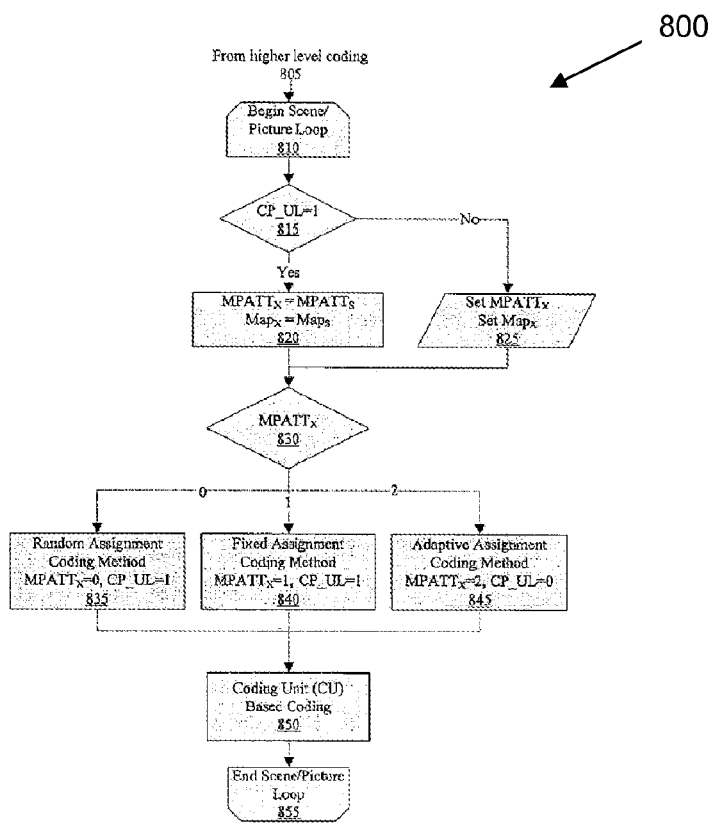
FIG. 8 depicts an example of a framework for scene-level coding or picture-level coding.
Figure 13:
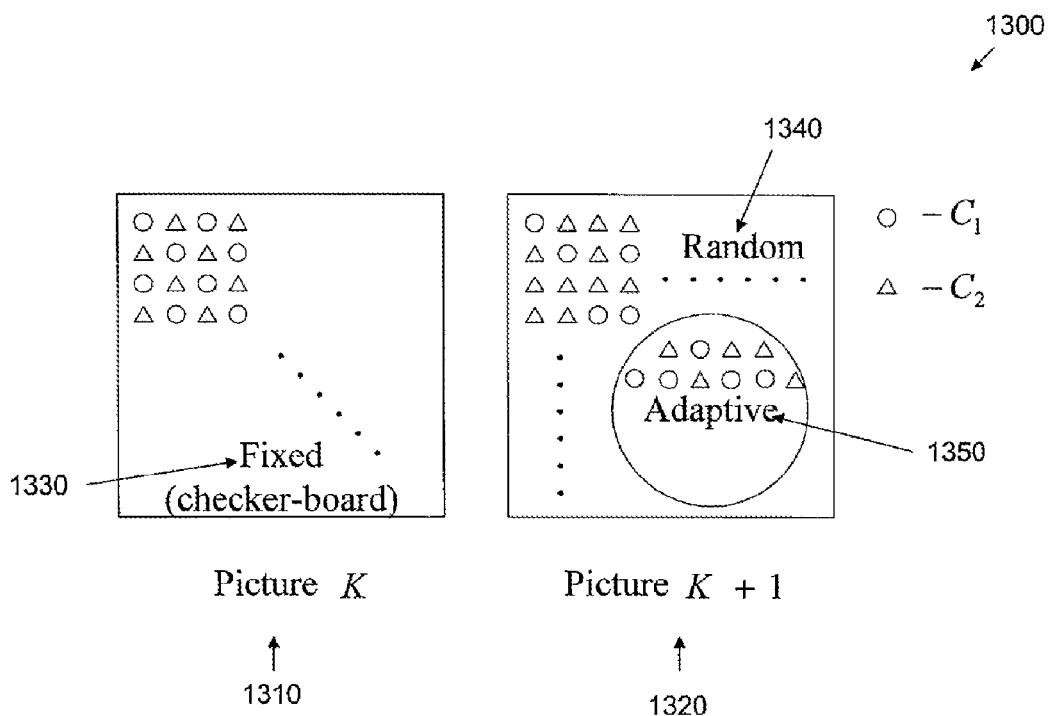
FIG. 13 depicts an example of a complexity level assignment.
Figure 14:
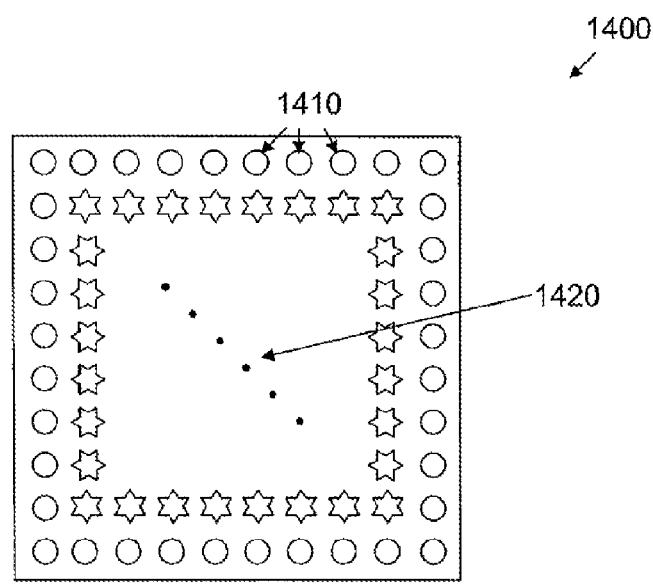
FIG. 14 depicts an example of location-based complexity assignment scheme.

Some embodiments of these complexity-scalable coding mode decision schemes are depicted in and described below with respect to FIGS. 7-14. Complexity-scalable coding schemes can be modeled and described hierarchically. For example, FIG. 7 illustrates an example of a complexity allocation scheme at the sequence level. FIG. 8 illustrates examples of embodiments for a framework for scene-level coding and/or picture-level coding, in which FIG. 8 can have processes that begin from the upper level (e.g., the sequence level of FIG. 7) of the hierarchy. FIGS. 9A-9F, 10 illustrate examples for coding unit based (CU) coding, which can begin in the hierarchy, for example, from scene/picture level coding (FIG. 8). FIGS. 11-13 illustrate examples for combinations of coding levels and/or complexity assignments. FIG. 14 is described below with respect to system embodiments. Although various parameters are described and shown below, some embodiments can have variations of those parameters for similar purposes.

Figure 10:
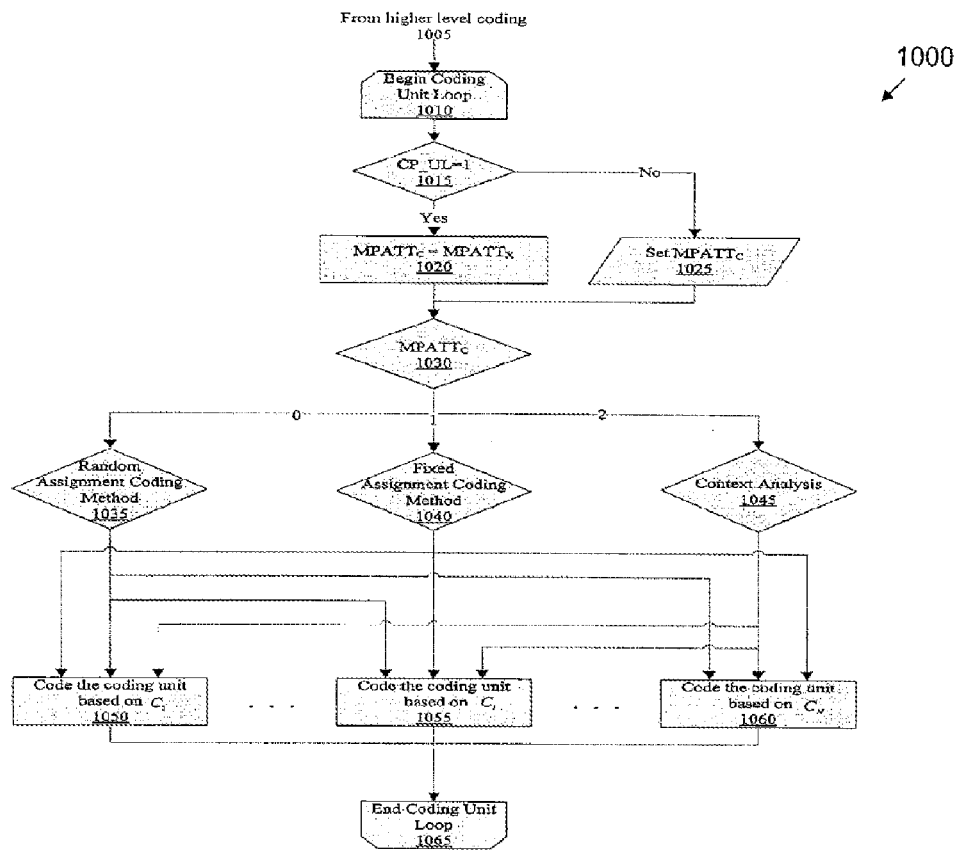
FIG. 10 depicts example of a framework for coding unit (CU)-based coding.

Although the FIGS. 7, 8, and 10 depict one or more parts of an inter-related, multi-level flow diagram to determine complexity assignment selection for the coding of various coding units for video, there can be embodiments that may be different from the inter-related, multi-level flow diagram of FIGS. 7, 8, and 10. For example, there can be methods of different complexity that can be applied to video at a scene, picture, or region/block level. The complexity assignment can be random throughout, fixed, or adaptive. Adaptive methods may be assigned within each of multiple sub-regions of a region/block, depending on the level, which may satisfy the same rules. Other embodiments of the complexity assignment scheme may not have the hierarchical structure as shown in FIGS. 7, 8, 10, and may have other assignment coding methods and/or have another order for the assignment coding, such as parallel complexity assignments. For instance, there can be assignments for one or more coding method types of complexity to video for any one of or any combination of coding decision levels associated with a sequence of pictures, a group of pictures (GOP), at least one of the pictures, a scene of the sequence of pictures, a region of the scene or at least one picture, a block, or a macroblock.

Complexity Allocation Schemes at the Sequence Level

FIG. 7 depicts an example of a complexity allocation scheme 700 at the sequence level. The process for the scheme 700 begins with a sequence of pictures (705). Then the first three parameters $MPATT_S$, $MSceneAna_S$, and $Map_S$ are set (710). Parameter $MPATT_S$ represents the pattern decision parameter for determining a type of coding method (e.g., random assignment, fixed assignment, adaptive assignment) for complexity allocation at the sequence level, parameter $MSceneAna_S$ represents the parameter to determine whether scene analysis is used, and parameters $Map_S$ is a map for one specific pattern. These parameters can be adaptively set by the system or manually set by a user.

In some embodiments, statistics of the sequence may be used to set the parameters. For example, simple statistics can invoke a certain pattern using a fixed coding method for a given type of performance, or complicated statistics can invoke another pattern map using an adaptive coding method for another type of performance, or any other variation or combination of patterns and methods. The statistics may also be based on properties of the encoder and/or decoder.

The scheme 700 can achieve different tradeoffs between complexity and performance. For example, three types of coding methods can be supported for complexity allocation: a random assignment coding method (720), a fixed assignment coding method (725), and an adaptive assignment coding method (730). Parameter $MPATT_S$ can be used as an indicator to set the types of coding methods. The system or the user can set $MPATT_S$=0 for the random assignment coding method (720), or $MPATT_S$=1 for the fixed assignment coding method (725), or $MPATT_S$=2 for the adaptive assignment coding method (730). These coding methods can employ one or more patterns with one or more complexity levels.

In embodiments of the coding system, coding is performed on every coding unit. For the higher levels (e.g., the scene, picture, or sequence levels), the system can set the parameters. The higher levels may refer to levels where one or more parameters and/or coding decisions are determined prior to coding the coding unit. In the coding unit, MPATTc can represent the parameter that determines the coding method, which can be set (as described with respect to FIG. 10) or copied from a higher level if not already at the highest level.

Random Assignment Coding Method

The random assignment coding method can allocate algorithms of a certain complexity to different coding units using a "random" allocation method. The allocated algorithms may be selected based on a probability. The probability of selecting a certain algorithm of complexity K could be uniform, Gaussian, or Laplacian, among others.

If $MPATT_S$ is set to the random assignment coding method (720), every picture in the sequence can be encoded with the random coding complexity allocation method. The sequence can be encoded sequentially picture by picture. As example of a process to perform the picture level coding is described below with respect to FIG. 8. The parameter CP_UL indicates whether the picture-level coding (performed later in the hierarchy) would copy the parameters from the upper level (e.g., the sequence level). In this case, CP_UL is set to one (720), and this ensures that the whole sequence would be encoded with the random assignment coding method.

In FIG. 7, when $MPATT_S$ is set to the random assignment coding method (720), picture level coding (750) is invoked (as described with respect to FIG. 8). In FIG. 8, because CP_UL is set to one (815), $MPATT_X$ is set to be equal to $MPATT_S$ (820), which indicates that the random assignment coding method is used (835). Therefore, in the coding unit based coding (as described with respect to FIG. 10), because CP_UL is equal to one (1015), $MPATT_C$ is set to be equal to $MPATT_X$ (1020), and the random assignment coding method can be invoked for every coding unit (1035). CP_UL is set equal to one (835) in the picture level. The random assignment coding method at the sequence level can ensure that every coding unit in the sequence would be encoded with the random assignment coding method.

Fixed Assignment Coding Method

The fixed assignment coding method can allocate algorithms of a certain complexity to different coding units using a fixed allocation method. For example, the allocation of an algorithm of complexity K could be done every N frames, while an algorithm of complexity K+1 is done every M frames (excluding those overlapping with complexity K). Complexity allocation patterns could be, for example, periodic or/and follow some other relationship, e.g., increasing or decreasing in complexity within a certain unit, such as a Group of Pictures (GOP).

If $MPATT_S$ is set to fixed assignment coding method (725), every picture in the sequence can be encoded with the fixed coding complexity allocation method. CP_UL is set to one (725), which ensures that the whole sequence would be encoded with the fixed assignment coding method. $Map_S$ can represent a predefined complexity map for the sequence level. In the case that different slice types are used (e.g., I, P, or B), $Map_S$ could be different depending on the slice type.

In FIG. 7, when $MPATT_S$ is set to the fixed assignment coding method (725), picture level coding (750) is invoked (as described with respect to FIG. 8). In FIG. 8, because CP_UL is set to one (815), $MPATT_X$ is set to be equal to $MPATT_S$ (820), which is used to indicate the fixed assignment coding method (840). $Map_X$ can represent a complexity map for the picture level and $Map_X$ is set to be equal to the complexity map in the sequence level $Map_S$ (820). CP_UL is set to one (840) in the picture level. In the coding unit based coding (as described with respect to FIG. 10), because CP_UL is equal to one (1015), $MPATT_C$ is set to be equal to $MPATT_X$ (1020), and the fixed assignment coding method is invoked for every coding unit (1040). The coding units can be encoded with the complexity levels defined by $Map_X$. The fixed assignment coding method at the sequence level can ensure that every coding unit in the sequence would be encoded with the fixed assignment coding method.

Adaptive Assignment Coding Method

If $MPATT_S$ is set to the adaptive assignment coding method (730), the coding can be made in an adaptive manner based on the characteristics of the picture and/or sequence. The adaptation in the coding can be based on various characteristics of the image, such as slice types used (e.g., available prediction modes), brightness, variance, object analysis, motion, picture distance from a last scene change, and/or scene analysis, among others. The adaptation can also be based on complexity restrictions that may have been imposed on the encoder (e.g., processing and/or computational time constraints of the encoder). In this case, CP_UL is set to zero (730), which can allow flexibility in the coding methods that can be used.

For the adaptive assignment coding method (730), a decision is made using the parameter MSceneAna$_S$ to determine whether scene analysis would be performed for the sequence (735). The parameter for MSceneAna$_S$ can indicate if scene analysis is enabled or disabled. If scene analysis is disabled, the coding method for the sequence would be set to picture-level complexity allocation coding (750), where every picture would be encoded with a predetermined coding method. If scene analysis is enabled, then scene analysis is performed where the various transitions through the sequence are classified, including scene changes, fade-in/outs, and cross-fades among others (740). Scene level coding is used to assign different coding methods to different scenes in order to enhance the usage of the characteristics of the sequence (750). Picture-level coding may be considered a special case of scene-level coding because an individual picture can be a scene in the extreme case. After the picture-level coding (750) or the scene-level coding (745) is performed, then the process for the sequence ends (755).

In the adaptive assignment coding method, a picture or a scene may be the next lower level for the coding depending on the parameter MSceneAna$_S$. For either the picture or the scene, CP_UL is set to zero (730). In the next (lower) level (FIG. 8), MPATT$_X$ and Map$_X$ can be reset by the system or the user. Depending on the value of the parameter MPATT$_X$, different coding methods may be invoked in the scene/picture level, which can ensure the flexibility of the adaptive assignment coding method.

A Framework for Scene-Level Coding and/or Picture-Level Coding

FIG. 8 depicts an example of a framework 800 for scene-level coding or picture-level coding. Scene-level coding (745) and picture-level coding (750) are shown in the blocks of FIG. 7. In framework 800, a higher level of coding is performed (805) as in FIG. 7, and the process begins for a scene or continues from a loop of the scene or picture (810). The parameter CP_UL is derived from the upper sequence level, in which CP_UL can determine whether parameters (MPATT$_X$ and Map$_X$) are copied from the upper level (e.g., the sequence level, as in FIG. 7) for every scene/picture. If CP_UL is one (815), then there is an indication for random or fixed patterns from the sequence level. Also, if CP_UL is one (815), the pattern decision parameter MPATT$_X$ for the current level is set to the upper level parameter MPATT$_S$ and the parameter Map$_X$ for the complexity map for the picture level is set to the upper level parameter Map$_S$ (820), the complexity map in the sequence level. If CP_UL is zero, then there is an indication for the adaptive pattern from the sequence level. If CP_UL is zero, the pattern decision parameter MPATT$_X$ is initialized by the system or by the user for every scene/picture, and the fixed pattern map Map$_X$ is initialized adaptively (825). Using the pattern decision parameter MPATT$_X$ (830), at least three types of coding methods for complexity allocation can be supported: a random assignment coding method (835), a fixed assignment coding method (840), or an adaptive assignment coding method (845). After the coding unit based coding (850) is performed, the process for the scene/picture ends (855).

Random Assignment Coding Method

If MPATT$_X$ is set to the random assignment coding method (830) (e.g., MPATT$_X$ is set to zero) then the scene/picture can be encoded with the random assignment coding method (835). CP_UL is set to one (835) to ensure that every coding unit in the scene/picture would be encoded with the random assignment coding method. Coding unit based coding (850) is then invoked (as in FIG. 10). Because CP_UL is equal to one (1015), MPATT$_C$ is set to MPATT$_X$, which is zero in this case, and every coding unit in the scene/picture can use the random assignment coding method.

In some embodiments, a random number generator can assign a corresponding number for every coding unit in the scene/picture. Then, the coding unit can be encoded based on a RDO complexity level that is determined by the randomly-generated number, a probability, or a distribution (e.g., Gaussian, uniform, Laplacian). In some cases, the randomly-generated number can be selected based on the probability or the distribution (e.g., one or more of Gaussian, uniform, Laplacian distributions). Complexity can be classified and/or quantified given an estimate or the exact value of the complexity required in terms of cycles, number of operations, an amount of time, an amount of memory, or other metrics.

Fixed Assignment Coding Method

If MPATT$_X$ is set to fixed assignment coding method (840) (e.g., MPATT$_X$ is set equal to one), the picture/sequence can be encoded with the fixed assignment coding method (840). CP_UL is set to one to ensure that every coding unit in the scene/picture is encoded with the complexity allocation for a fixed assignment coding method (840). In the fixed assignment coding method, Map$_X$ can represent a predefined map to determine the complexity level of every coding unit in a scene/picture. Different fixed patterns can be used in the fixed assignment coding method. Map$_X$ can be set to be equal to the upper level parameter Map$_S$ (820) or re-initialized (825) depending on the parameter CP_UL from the upper level. For the following coding unit level, every coding unit can choose a complexity level using the complexity map.

Figure 9A:
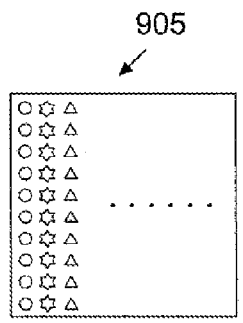
FIGS. 9A-9F depict examples of pictures with fixed patterns for the fixed assignment coding method of FIG. 8.
Figure 9B:
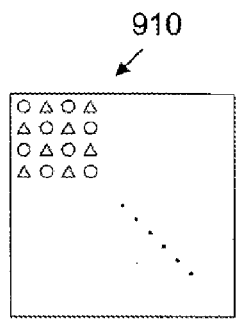
Figure 9C:
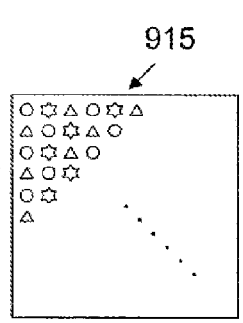
Figure 9D:
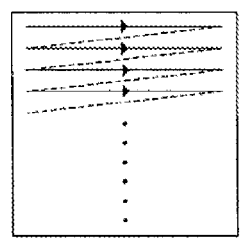
Figure 9E:
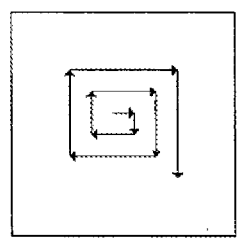
Figure 9F:
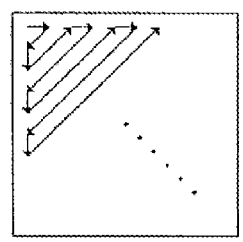

FIGS. 9A-9F depict examples of fixed patterns that can be used for the fixed assignment coding method of FIG. 8. These fixed patterns include a column-wise pattern 905 (FIG. 9A), a picture with a checker-board pattern with two categories of different complexity levels 910 (FIG. 9B), a picture with a checker-board pattern with three categories of different complexity levels 915 (FIG. 9C), a picture with a scan-order pattern 920 (FIG. 9D), a picture with a spiral pattern 925 (FIG. 9E), and a picture with a zig-zag pattern 930 (FIG. 9F). Every position in the figure may represent a coding unit.

For each of the columns in the column-wise pattern 905, a coding unit is assigned to a complexity level depending on its location. For example, the coding units in the odd indexed columns may have high complexity and the coding units in the even indexed columns may have low complexity. Some embodiments of the column-wise fixed pattern can be row-wise or diagonal line-wise fixed patterns.

For the checker-board type pattern 910, two categories with different complexity levels can be assigned alternatively. In some embodiments, more than two categories can be assigned for the picture if the categories are assigned alternatively. For example, three categories are available in the checker-board pattern 915 in FIG. 9C.

In other examples, the fixed assignment coding method can follow a scan order of how complexity is assigned. The scan order can begin from any point in the picture and can route the coding in some fixed manner. One example is shown in the picture with the scan-order pattern 920 of FIG. 9D, where the coding begins from a top-left corner of a picture and scans through the whole picture using the raster scan coding order (e.g., scanning left to right and top to bottom). For example, the coding units that are scanned before a specific position can be assigned to a different complexity level from the coding units that have scan orders after a specific position. The starting point of the scan can also be in the center of the picture, as shown in the spiral pattern 925 of FIG. 9E, on the boundaries of the picture. For example, the coding units belonging to the inner circles can be assigned to a different complexity level from the coding units at the outer circles. The zig-zag pattern 930 for the scanning order, as shown in FIG. 9F, can be another example of a scan order that is used for encoding.

In some examples, the fixed assignment coding method can have an irregular pattern. The irregular pattern can follow any pattern for a predefined map that is defined by the application or user.

Adaptive Assignment Coding Method

If MPATTx is set to the adaptive assignment coding method (845) (e.g., $MPATT_x$ is set to two), the coding assignment can be made in an adaptive manner. Some aspects of the adaptive assignment coding method for this level may be similar to the adaptive assignment coding method for the upper level, as described above with respect to FIG. 7. For example, CP_UL is set to zero, which can allow the combinations of the coding various methods for the coding unit based coding. In this level, segmentation can be performed for the scene/picture, and a region based coding can be selected. Segmentation can differentiate regions with different characteristics and every region can be assigned different coding patterns. In the extreme case, a picture can be a region.

Other Combinations of Pattern Coding Methods

From FIG. 8, the combinations of the sequence level parameters and the scene/picture level parameters can generate several cases. In some cases, if $MPATT_S$ is set to the random assignment coding method (835) or the fixed assignment coding method (840), $MPATT_X$ would be set to the same pattern because CP_UL=1 in the random or the fixed assignment coding methods.

In other cases, if $MPATT_S$ is set to the adaptive pattern, $MPATT_X$ can be set to one of the random, fixed, or adaptive patterns because CP_UL=0 in this case (e.g., in the adaptive assignment coding method). For example, if the scene/picture level parameter $MPATT_X$ is set to the random pattern for several pictures, then the random number generator for the pictures can be different from each other. In another example, if the scene/picture level parameter $MPATT_X$ is set to the fixed pattern for several pictures, the fixed pattern map $Map_X$ can be changed from one picture to another. For instance, one picture can employ a column-wise coding map, while the following picture can employ a checker-board type coding map.

When the parameters for the random assignment coding method, fixed assignment coding method, or the adaptive assignment coding method are determined and/or set, the coding unit (CU)-based coding can be performed (850). Coding unit (CU)-based coding is discussed below with respect to FIG. 10. After the CU-based coding is performed, then the process ends for the scene/picture (855) or loops back to another scene/picture in the loop (810).

Coding Unit-Based (CU) Coding

FIG. 10 depicts an example of a framework 1000 for coding unit (CU)-based coding. The coding unit can be a macroblock of 16×16 pixels, a block with an A×B dimension, or a sequence of macroblocks that correspond to a regular or irregular area defined by the application (e.g., a coding slice, a rate control basic unit, an irregular pattern corresponding to an object region, etc.). In FIG. 10, a decision is made per coding unit to perform CU-based coding from a higher level of coding, such as from a scene/picture (e.g., coding unit-based coding 850 in FIG. 8). The coding can begin or can be continued from a loop performed for every CU inside a scene/picture (1010). The parameter CP_UL is copied from the upper level to determine if it is equal to one (1015) to determine the pattern decision parameter $MPATT_C$. If CP_UL is equal to one, it indicates that the pattern decision parameter $MPATT_C$ is to be copied from the upper level (e.g., scene/picture) as $MPATT_X$ (1020). If CP_UL is not equal to one, $MPATT_C$ is set adaptively by the application, system, or the user (1025).

In some embodiments, at least three coding methods can be supported that can be indicated using the value of the pattern decision parameter $MPATT_C$ (1030): a random assignment coding method (1035), a fixed assignment coding method (1040), and context analysis (1045). A parameter can be generated by these methods for every CU based on a complexity budget, which can assign a certain complexity level to the corresponding coding unit. N coding methods may exist in the candidate set, in which each candidate set can have a different complexity level ($C_1, C_2, \ldots, C_N$), where the number of complexity levels N can be specified by the application. The different complexity levels generally can be related as $C_1 <= C_2 <= \ldots <= C_N$. Each coding method may be associated with a coding performance metric, such as ($X_1, X_2, \ldots, X_N$), where each value $X_i$ may be normalized when compared to a certain coding method (e.g., coding method m). In some embodiments, a percentage of CU encoding with complexity $C_i$ is $w_i$, such that $$\sum_{i=1}^{N} w_i C_i = C^0,$$

where $C^0$ is a total complexity budget for a scene/picture. For some applications, there may be constraints in complexity or in a power consumption budget. For such applications, the encoder may have a requirement to conform to the complexity and/or power consumption budget, and adjustments may be made during the encoding process. In some embodiments, the complexity budget may be fixed for a scene/picture, or may be adaptively adjusted based on the expected (e.g., expected given an $X_i$) encoding quality or resulting encoding quality. Different complexity levels can be assigned to different spatial areas while maintaining the targeted complexity budget. The spatial assignment can have complexity scalability with a continuous complexity range. At least three of the following coding methods can be used to assign the complexity levels to a CU in different manners.

Random Assignment Coding Method

If there is an indication that MPATTc is set to zero (1030), MPATT$_c$ is set to the random assignment coding method (1035). In the random assignment coding method (1035), a random number generator can generate numbers that map to N categories. Every CU can be assigned to a category that corresponds to a complexity level $C_i$. Then, the coding unit process will end (1065), or loop back to the beginning of the coding unit loop (1010). There can be several methods to generate the random numbers. For example, a linear feedback shift register can be used to generate pseudo random numbers. Another example can involve generating a uniformly-distributed variable, and then using the inverse transform sampling method to generate a random number.

Fixed Assignment Coding Method

If there is an indication that MPATT$_C$ is set to one (1030), MPATT$_C$ is set to the fixed assignment coding method (1040). As described with respect to the scene/picture level coding, Map$_X$ can be defined for a scene/picture, in which different complexity levels can be assigned for every CU. For region-based coding, Map$_X$ can define the map for the region of interest. Every CU can be encoded with the corresponding complexity level $C_i$ based on the map. Then, the coding unit process will end (1065), or loop back to the beginning of the coding unit loop (1010).

Adaptive Assignment Coding Method

If there is an indication that MPATTc is set to two (1030), MPATTc is set to the method to perform context analysis (1045), and the coding can be performed by conducting an analysis on the context and/or scene. In some embodiments, context analysis can be performed for every CU to determine a complexity level. The determination can be made in an adaptive manner, which can make use of the characteristics of the area and/or the complexity or quality budget that is allocated to that region. In some embodiments, a context analysis model can make the determination based on the features of the coding unit and/or the locations/positions of the coding unit. These two considerations (e.g., feature-based adaptive coding, location-based adaptive coding) of the context analysis determination are described below.

1) Feature-Based Adaptive Coding

The framework 1000 may have a context analysis module, which can derive the features of the coding unit, such as the DC value, the variance, or texture/edge information, among others. For example, areas with higher variance might benefit more from a higher complexity mode decision process. Based on this observation, there can be an adaptive decision on the complexity of each coding unit. The coding unit can be ranked given its variance, and several thresholds can be applied to assign the categories. Coding units with higher variance can be encoded with a higher complexity RDO process, and coding units with lower variance can be encoded with lower complexity RDO.

For example, if the variance of the i-th coding unit is $Var_i$ and there are thresholds $T_1, T_2, \ldots, T_{N-1}$, the category assignment can be:

$$C_i = \begin{cases} C_1 & Var_i \le T \\ \ldots \\ C_k & T_{k-1} < Var_i \le T \\ \ldots \\ C_N & Var_i > T_{N-1}. \end{cases} \quad (5)$$

The scheme can capture the areas that will potentially benefit more from using a decision method of higher complexity. The coding units can be coded based on complexity levels $C_1$ to $C_N$ (1050-1060). Then, the coding unit process will end (1065), or loop back to the beginning of the coding unit loop (1010).

In some embodiments the context analysis module can also consider an object segmentation method. For instance, different segments can be classified based on their complexity. Also, clustering methods, edge-detection methods, region growing methods, and level set methods can be used for the segmentation of the picture. For example, edges or object boundaries can be assigned to a higher encoder complexity mode decision process, and the smooth areas can be assigned to a lower encoder complexity mode decision process. To speed up the context analysis module, a lower-resolution version of the picture can be considered, and the features of the lower-resolution version of the picture can be used for the category assignment for the input picture.

2) Location-Based Adaptive Coding

The context analysis module for the framework 1000 can assign different parameters to the coding units based on their positions/locations. For example, different complexity schemes can be assigned depending on whether the coding unit is a boundary coding unit or internal unit. Feature-based and location-based adaptive coding may belong to a context analysis technique, which can assign different complexity level for every CU.

FIG. 14 depicts an example of location-based complexity assignment scheme 1400. In the scheme 1400, the internal unit 1420 may be assigned a higher complexity than the boundary units 1410 due to the higher importance. In some cases, the internal unit 1420 may be more important to viewers and should be encoded with higher complexity. The definition of the internal/outer areas can be adjusted based on the application.

Additionally, a region of interest (ROI) in a picture can be identified and assigned to a different complexity mode decision process. For example, in a face recognition scenario, a subjective quality of a person's face may be an ROI that may be more important than that of the background. In this case, the face may be best encoded with a high complexity mode decision process. In other embodiments, the complexity scheme can be adjusted (e.g., via altering the probability of selecting a certain complexity coding method) based on a distance from an earlier assignment (e.g., how far the complexity assignment is away from the last high or low complexity assignment) or combinations of assignments in previous coding units.

In some embodiments, the context analysis techniques can use spatial and/or temporal neighbors as a reference in the analysis. A memory unit or device can store and provide access to the context analysis results in past frames. The stored context analysis results can be used to predict or assist the context analysis for the current picture.

FIG. 10 presents the process performed when coding a coding unit. For example, certain complexity coding method can be selected given earlier decisions methods, or, assuming the adaptive assignment method was used, within the current level by examining characteristics of the coding unit or by considering other parameters or information at that level. The other processes in the hierarchy (e.g., FIGS. 7-8) can be used to decide how the coding will be done when it reaches the point where coding is to be performed (e.g., the coding units can be coded using complexity levels $C_i$ to $C_N$ (1050-1060)). Encoding given the particular complexity level is done at this level (1050-1060). Hence, computational and system resources can be conserved in primarily determining the coding decisions within the upper levels of the hierarchy, as in FIGS. 7-8, and conducting the actual coding at the bottom level of the hierarchy (e.g., near the termination of the processes of FIG. 10). In some embodiments, not all levels are used to determine the complexity parameters.

Combinations of Coding Levels and Complexity Assignments

Figures 11A, 11B:
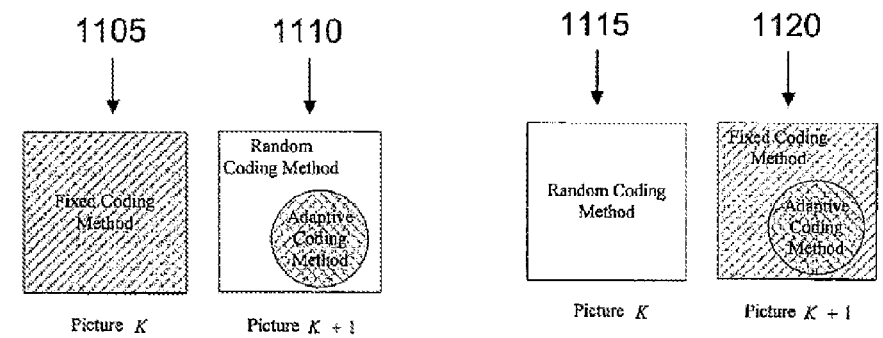
FIGS. 11A-11D depict examples of complexity allocation patterns.
Figure 11C:
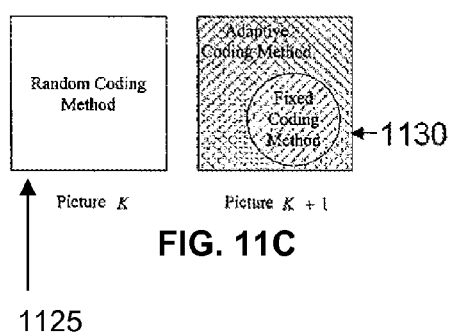
Figure 11D:
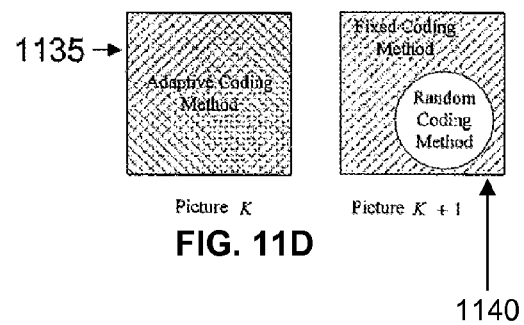

FIGS. 11A-11D depict examples of complexity allocation patterns. The complexity allocation techniques shown and described above can provide a hierarchical decision that allows for a variety of combinations for the coding methods. Some of the resulting complexity allocation patterns are shown in FIGS. 11A-11D. FIG. 11A depicts patterns for a fixed assignment coding method in Picture K 1105, and random and adaptive assignment coding methods in Picture K+1 1110. FIG. 11B depicts patterns for a random assignment coding method in Picture K 1115, and fixed and adaptive assignment coding methods in Picture K+1 1120. FIG. 11C depicts patterns for a random assignment coding method in Picture K 1125, and adaptive and fixed assignment coding methods in Picture K+1 1130. FIG. 11D depicts patterns for an adaptive assignment coding method in Picture K 1135, and fixed and random assignment coding methods in Picture K+1 1140.

In the sequence level, the adaptive assignment coding method can be chosen and every scene/picture can be analyzed with different coding methods. In FIG. 11A, for example, Picture K 1105 can be used with a fixed assignment coding method, and the coding units that belong to the picture would assign the complexity level according to some specific pattern, such as one of the patterns in FIGS. 9A-9F. In Picture K+1 1110, the adaptive assignment coding method can be applied to the area inside a circular region, and the random assignment coding method can be applied to the background region. In FIG. 11B, Picture K 1115 can be used with a random assignment coding method, and the coding units that belong to the picture would assign the complexity level according to some specific pattern, such as one of the patterns in FIGS. 9A-9E. In Picture K+1 1120, the adaptive assignment coding method can be applied to the area inside a circular region, and the fixed assignment coding method would be applied to the background region. FIGS. 11C-11D have various coding methods and applied complexity levels to pictures and/or regions that are similar to FIGS. 11A-11B.

The coding schemes with complexity level $C_i$ can be any combination of the available coding tools. The following are some examples of the coding schemes that could be considered in conjunction with the complexity allocation schemes described herein.

Some embodiments of the coding schemes can include a low complexity RDO, as in equation (3), with all available modes.

Some embodiments of coding schemes can include a high complexity RDO, as in equation (4), with all available modes.

Some embodiments of coding schemes can be a combination of the low and/or high complexity RDO with a mode-skipping scheme, where only a subset of the available modes is available. Such embodiments can provide flexibility in the complexity levels, and can reduce complexity because a portion of the available modes are employed. For example, computations can be conducted to determine modes that are to be considered the best modes. In some embodiments, the process of determining the best modes may include modes with a high probability of being the best modes (e.g., modes that have a probability greater than a threshold level). The most probable modes may be derived from the edge property or the neighbor blocks. The modes with a low probability of being the best mode can be skipped in the examination. The remaining modes can then be examined with low/high complexity RDO to choose the best mode.

Some embodiments of coding schemes can include low/high complexity RDO with early termination. The encoder (e.g., the encoder in FIG. 1) can check the modes in a fixed order or in an adaptive order. The encoder can adaptively choose the most probable modes for the current coding unit and check those modes first. The most probable modes can be derived from the modes of the neighboring coding units or from the characteristics of the current coding unit. One or more thresholds can be defined to check the early termination condition. A macroblock can be considered one example of the coding unit.

For example, if a cost for a mode is smaller than threshold T, then early termination can be performed, and the mode can be selected as the best mode. Otherwise, the encoder would keep on checking the remaining modes until a cost for a mode is smaller than the threshold T. In P/B slices, the threshold condition can be examined for a skip or direct mode and early termination can be decided in an early stage. In the extreme case, T can be zero, or even negative, and the encoder can check all the available modes for the mode decision. The thresholds can be fixed thresholds or adaptive thresholds. A fixed threshold could be based, for example, on statistics of various tested sequences, their resolution, and the current quantization parameters of interest. An adaptive threshold can be derived, for example, as a function of the minimum costs of neighboring coding units.

For instance, if the minimum costs of the neighbors A, B and C are $J_{min}(A)$, $J_{min}(B)$, and $J_{min}(C)$, respectively, then the threshold T of the current coding unit can be expressed as:

$$T = a \times \min(J_{min}(A), J_{min}(B), J_{min}(C)) + b, \quad (6)$$

where a and b can represent constant values or be adaptive values, given the content and prior decisions.

Some embodiments of the complexity allocation schemes can involve intra coding in I/P/B slices. Also, some coding schemes can include the combination of the low and high complexity RDO.

Figure 12A:
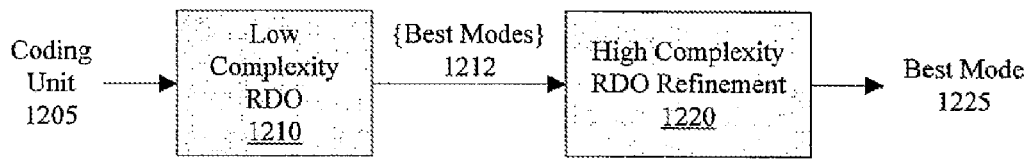
FIG. 12A depicts an example of coding with low complexity rate distortion optimization (RDO) and high complexity RDO.

For instance, FIG. 12A depicts an example of coding with low complexity RDO and high complexity RDO. The coding unit 1205 is first encoded with low complexity RDO 1210 for every intra block size $M_k$. L modes $\{M_k^{(i)}\}$ 1212 are selected for every $M_k$. The L best modes are the modes having the smallest distortion metric (e.g., a distortion metric less than some threshold). Then, the encoder chooses the final best mode 1225 from these L best modes candidates using a high complexity RDO refinement 1220. In some embodiments, the number of the best modes L can be fixed or adaptively chosen according to the distortion.

Figure 12B:
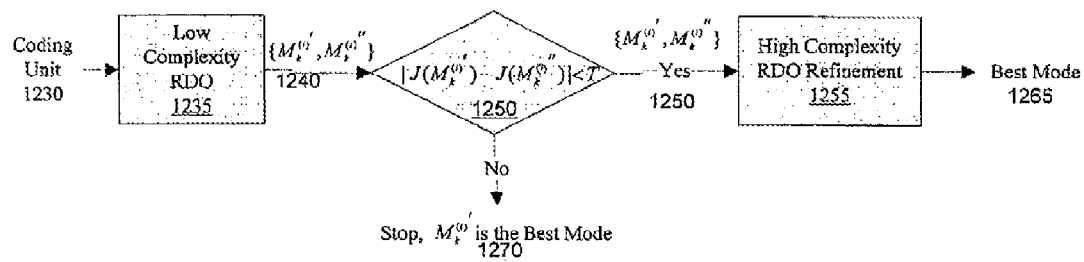
FIG. 12B depicts another example of coding with low complexity RDO and high complexity RDO.

In another example, FIG. 12B depicts an example of coding with low complexity RDO and high complexity RDO. The coding unit 1230 is first encoded with low complexity RDO 1235 for every intra block size $M_k$. The L best modes (e.g., best mode $M_k^{(i)'}$, second-best mode $M_k^{(i)''}$, etc.) are the modes having the smallest distortion metric. The gap between distortions of best modes can be expressed as $|J(M_k^{(i)'})-J(M_k^{(i)''})|$. If the gap between the distortions of the best mode $M_k^{(i)'}$ and the second-best mode $M_k^{(i)''}$ is high (e.g., if $|J(M_k^{(i)'})-J(M_k^{(i)''})|<T$ is false, where T is a threshold), no refinement is needed and $M_k^{(i)'}$ is the best mode (1270). If the gap between the distortions $|J(M_k^{(i)'})-J(M_k^{(i)''})|$ is low (e.g., if $|J(M_k^{(i)'})-J(M_k^{(i)''})|<T$ is true), both the best mode $M_k^{(i)'}$ and second-best mode $M_k^{(i)''}$ can be considered (1250) for further refinement using a higher complexity RDO (1255). The best mode 1265 is then chosen between these two modes.

Similar approaches can be applied to P/B slices as the above embodiments for the I/P/B slices. For P/B slices, a low complexity RDO can be applied to the available modes and select the L best modes. Then, a refinement process can be performed using the high complexity RDO to choose the best mode. For example, in the first level mode decision, if inter block sizes 16×16 and 16×8 (L=2) were selected as the two best modes after considering a lower complexity RDO process, then a higher complexity RDO can be applied using only these two modes, which can then be used to determine the best mode.

In some embodiments for P and B slices there can be coding schemes with a different or/and a different number of references, coding blocks, and/or different search ranges for motion estimation. In some of these embodiments, different motion estimation schemes can be considered, or for predictive motion estimation schemes (e.g., the Enhanced Predictive Zonal Search algorithm), a different number of predictors can be used for each coding scheme.

Some embodiments can be in the context of Trellis quantization. In these embodiments there can be multiple quantization parameters (QP) for encoding a block, such as J different QP values, in which the number for J could be adjusted given the coding scheme.

FIG. 13 depicts an example of a complexity level assignment 1300. In assignment 1300, Picture K 1310 assigns the complexity levels with a fixed, checker-board pattern, and Picture K+1 1320 assigns complexity levels in an adaptive pattern in a circular area 1350, and a random pattern in the background 1340. There are two complexity levels in the assignment $C_1$ and $C_2$. In assignment 1300, $C_1$ and $C_2$ can be any of the coding schemes discussed above, including the examples of low complexity RDO, high complexity RDO, or the coding schemes shown in FIGS. 12A-12B.

Example Systems

Figure 15:
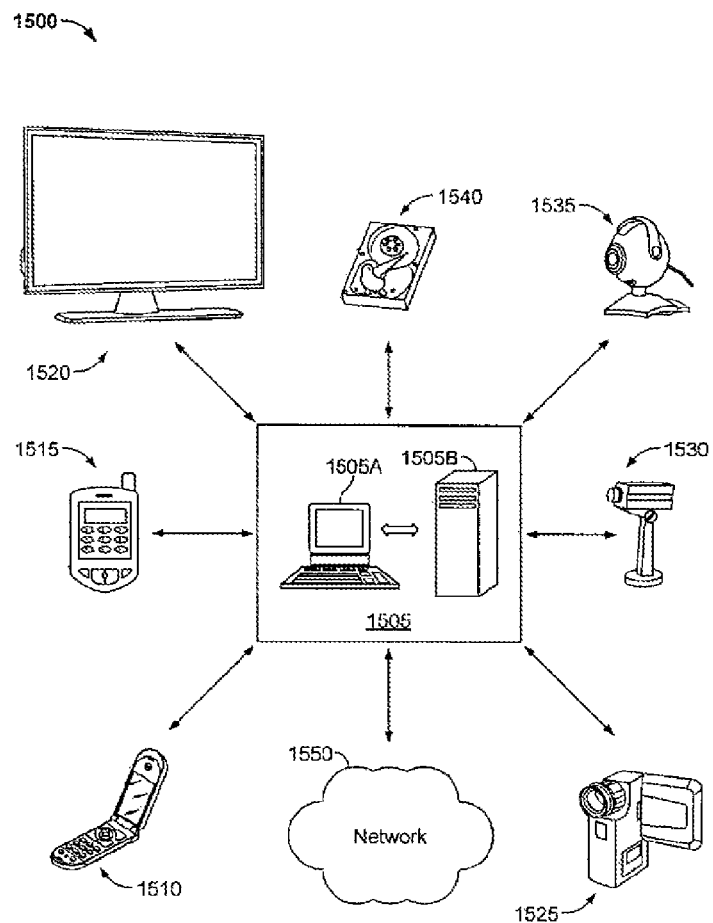
FIG. 15 depicts an example of a system.

FIG. 15 depicts an example of a system that can employ any (or any combination) of the complexity allocation techniques described herein. The techniques can be used on one or more computers 1505A, 1505B. One or more methods (e.g., algorithms and/or processes) herein can be implemented with, or employed in computers and/or video display 1520, transmission, processing, and playback systems. The computers described herein may be any kind of computer, either general purpose, or some specific purpose computer such as a workstation. The computer 1505B may be, e.g., an Intel or AMD based computer, running Windows XP™, Vista™, or Linux™, or may be a Macintosh computer. An embodiment may relate to, e.g., a handheld computer, such as a PDA 1515, cell phone 1515, or laptop 1505A. The computer may also refer to machines or parts of a machine for image recording or reception 1525, 1530, 1535, processing, storage 1540, and distribution of data, in particular video data.

Any combination of the embodiments described herein may be part of a video system and its components. Any combination of the embodiments may be part of a video encoder, as in the example video encoder of FIG. 1A and/or video decoder of FIG. 2. Any combination of the embodiments may be implemented in hardware and/or software. For example, any of the embodiments may be implemented with a computer program.

Computer and/or graphic programs may be written in C or Python, or Java, Brew or any other programming language. The programs may be resident on a storage medium, e.g., magnetic or optical, e.g., the computer hard drive, a removable disk or media such as a memory stick or SD media, wired or wireless network based or Bluetooth-based (or other) Network Attached Storage (NAS), or other fixed or removable medium. The programs may also be run over a network 1550, for example, with a server or other machine sending communications to the local machine, which allows the local machine to carry out the operations described herein. The network may include a storage area network (SAN).

Although only a few embodiments have been described in detail above, other embodiments are possible. It should be appreciated that embodiments of the present invention may encompass equivalents and substitutes for one or more of the example techniques described herein. The present specification describes specific examples to accomplish a more general goal in another way. This description should be understood to represent example embodiments and the claims following are intended to cover any equivalent, modification or alternative.

Embodiments of the subject matter and the functional operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, e.g., one or more modules of computer program instructions encoded on a computer readable medium for execution by, or to control the operation of, data processing apparatus. The computer readable medium can be a machine-readable storage device 1540, a machine-readable storage substrate, a memory device, a composition of matter effecting a machine-readable propagated, processed communication, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a graphical system, a database management system, an operating system, or a combination of one or more of them.

A computer program (also known as a program, software, software application, script, or code) can be written in any form of programming language, including compiled or interpreted languages, and it can be deployed in any form, including as a stand alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows and figures described and depicted in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or another programmable logic device (PLD) such as a microcontroller, or an ASIC (application specific integrated circuit).

Processors suitable for the execution of a computer program include, by way of example, both general and special purpose microprocessors, and any one or more processors of any kind of digital computer. Generally, a processor can receive instructions and data from a read only memory or a random access memory or both. The essential elements of a computer are a processor for performing instructions and one or more memory devices for storing instructions and data. Generally, a computer can also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, some embodiments of the subject matter described in this specification can be implemented on a computer having a display device, e.g., a CRT (cathode ray tube), LCD (liquid crystal display), or plasma display monitor 1520, for displaying information to the user and a keyboard and a selector, e.g., a pointing device, a mouse, or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Some embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an embodiment of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this disclosure contains many specifics, these should not be construed as limitations or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software or hardware product or packaged into multiple software or hardware products.

The term "algorithm" can refer to steps, methods, processes, schemes, procedures, operations, programs, guidelines, techniques, sequences, and/or a set of rules or instructions to achieve the results described herein. For example, an algorithm can be a set of video processing instructions for a hardware and/or software video processor. The disclosed algorithms can be related to video and can be generated, implemented, associated, and/or employed in video-related systems and/or any devices, machines, hardware, and/or articles of manufacture for the processing, compression, storage, transmission, reception, testing, calibration, display, and/or any improvement, in any combination, for video data.

The techniques and systems described herein can be further extended to the optimization in other multimedia applications, such as audio compression and processing. One or more embodiments of the various types of formulations presented in this disclosure can take into account various display, processing, and/or distortion characteristics. In some aspects, the selection of coding methods can be partially or wholly decided based on the complexity, and/or channel of the modes and/or distortion metrics. As described herein, methods and systems can adaptively adjust coding based on complexity. The methods and systems described here can be applied on different levels, including a block level, a macroblock level, a slice level, sequence or scene level, etc., or a combination of different levels. The proposed inventions can also be applied to adaptive video encoder control when then distortion is measured by one or more distortion metrics. The embodiments herein can be used with various type of media, including audio, text, graphics, video, and related data. Various embodiments herein can apply to H.264, and any other video and image coding methods, including MPEG-4 Simple and Advanced Simple Profiles, MPEG-2, VC-1, and JPEG-2000 encoding, among others. The concepts herein can also be extended to audio coding methods as well.

An embodiment of the present invention may relate to one or more of the example embodiments enumerated below.

1. A method for coding of video, the method comprising:
   assigning one or more coding method types of complexity to video for any one of or any combination of coding decision levels associated with a sequence of pictures, a group of pictures (GOP), at least one of the pictures, a scene of the sequence of pictures, a region of the scene or the at least one picture, a block, or a macroblock; and
   coding a plurality of coding units as a function of complexity and the one or more coding method types determined from one or more of the coding decision levels, wherein:
   a first coding decision level is associated with determining a first complexity and a first coding method type for the sequence of pictures,
   a second coding decision level is associated with determining a second complexity and a second coding method type for the at least one of the pictures or the scene of the sequence of pictures, wherein the at least one picture or the sequence of pictures comprises the plurality of coding units; and
   a third coding decision level is associated with determining a third complexity and a third coding method type for the plurality of coding units.
2. The method of Enumerated Example Embodiment, wherein the coding units comprise a macroblock of pixels or a sequence of macroblocks for an area, wherein the sequence of macroblocks correspond to a coding slice, a rate control unit, or a pattern corresponding to an object region.
3. The method of Enumerated Example Embodiment further comprising assigning a number of hierarchical levels of coding decision levels.
4. The method of Enumerated Example Embodiment wherein the number of hierarchical levels is selected adaptively.
5. The method of Enumerated Example Embodiment wherein the number of hierarchical levels is selected by a video system user.
6. The method of Enumerated Example Embodiment wherein the first coding decision level comprises a sequence coding level, the second coding decision level comprises a picture coding level or a scene coding level, and the third coding decision level comprises a coding unit coding level.
7. The method of Enumerated Example Embodiment 0, further comprising:
   in the first coding decision level, allocating a plurality of coding parameters, wherein the allocating comprises:
   allocating a pattern decision parameter for complexity allocation at the sequence Coding level;
   allocating a scene parameter to indicate if scene analysis is used during any of the determinations; and
   allocating a map parameter to indicate a map pattern.
8. The method of Enumerated Example Embodiment further comprising:
   in the first coding decision level, allocating any of the parameters by a user, or allocating any of the parameters using one or more statistics to allocate the one or more parameters.
9. The method of Enumerated Example Embodiment wherein allocating any of the parameters using one or more statistics comprises utilizing statistics on the sequence to invoke one or more pattern maps using one or more of the coding method types.
10. The method of Enumerated Example Embodiment further comprising:
    in the first coding decision level, selecting at least one of the coding method types based on the one or more allocated parameters, wherein any of the coding method types comprises a fixed assignment coding method, a random assignment coding method, or an adaptive assignment coding method.
11. The method of Enumerated Example Embodiment wherein at least one of the parameters in the plurality of parameters indicates whether every picture in the sequence is to be coded with a same coding method type.
12. The method of Enumerated Example Embodiment wherein any of the coding method types comprises intra coding modes, inter coding modes, or a combination of inter and intra coding modes.
13. The method of Enumerated Example Embodiment wherein any of the coding method types comprises one or more statistical characteristics of an encoder or decoder.
14. The method of Enumerated Example Embodiment further comprising allocating one or more complexity levels to one or more spatial areas.
15. The method of Enumerated Example Embodiment wherein, in the first coding decision level, the adaptive assignment coding method uses one or more coding method types and one or more coding patterns for one or more pictures in the sequence or a scene of the sequence.
16. The method of Enumerated Example Embodiment wherein the adaptive assignment coding method is based, at least in part, on a characteristic of an image, a slice type, a prediction mode, a brightness level, a variance, an object analysis, motion, a picture distance from a last scene change, a scene analysis, or one or more characteristics of the encoder.
17. The method of Enumerated Example Embodiment further comprising:
    in the first coding decision level, determining if scene analysis is enabled or disabled, wherein if scene analysis is disabled, the second coding decision level uses picture-level complexity allocation, and wherein if scene analysis is enabled, the second coding decision level uses scene-level complexity allocation.
18. The method of Enumerated Example Embodiment wherein the scene-level complexity allocation comprises the picture-level complexity allocation.
19. The method of Enumerated Example Embodiment wherein the scene-level complexity allocation comprises classifying one or more transitions in the sequence, wherein the one or more transitions comprises scene changes, fade-ins, fade-outs, or cross-fading, and wherein the scene-level complexity allocation further comprises assigning one or more coding method types to different scenes.

20. The method of Enumerated Example Embodiment wherein, in the second coding decision level, the method comprises:
  determining whether the one or more parameters from the first coding decision level are to be used in the second coding decision level; and
  if one or more parameters from the first coding decision level are determined to be used in the second coding decision level, copying one or more parameters from the first coding decision level in the second coding decision level.
21. The method of Enumerated Example Embodiment wherein, in the second coding decision level, the method comprises:
  selecting at least one of the coding method types for the at least one of the pictures or the scene of the sequence of pictures based, at least in part, on the one or more allocated parameters.
22. The method of Enumerated Example Embodiment further comprising selecting the random assignment coding method for the at least one of the pictures or the scene of the sequence of pictures, the random assignment coding method comprises randomly encoding the plurality of coding units in the picture or scene.
23. The method of Enumerated Example Embodiment wherein the random assignment coding method for the picture or scene comprises:
  assigning randomly-generated numbers to the plurality of coding units using rate distortion optimization (RDO) complexity levels corresponding to the randomly-generated numbers.
24. The method of Enumerated Example Embodiment, wherein the random assignment coding method for the picture or scene further comprises:
  classifying the complexity using an estimate or a value of a system metric, wherein the system metric comprises an evaluation of the complexity with an amount of memory, a number of required operations, a required amount of time, or a required number of cycles, wherein the randomly-generated numbers are based, at least in part, on a probability or a distribution.
25. The method of Enumerated Example Embodiment further comprising selecting the fixed assignment coding method for the at least one of the pictures or the scene of the sequence of pictures, the fixed assignment coding method comprises encoding the plurality of coding units in the picture or scene with the fixed assignment coding method.
26. The method of Enumerated Example Embodiment wherein the fixed assignment coding method comprises using a fixed coding pattern for the picture or scene, wherein the fixed coding pattern comprises a column-wise pattern, a checker-board pattern, a scan-order pattern, a spiral pattern, a zig-zag pattern, an irregular pattern, a pattern with a plurality of complexity levels, a pattern with random complexity levels, a user-defined pattern, a system-defined pattern, or any combination of the patterns.
27. The method of Enumerated Example Embodiment further comprising selecting the adaptive assignment coding method for the at least one of the pictures or the scene of the sequence of pictures, encoding the plurality of coding units in the picture or scene with the adaptive assignment coding method, wherein the adaptive assignment coding method comprises one or more combinations or variations of the coding method types.
28. The method of Enumerated Example Embodiment wherein the adaptive assignment coding method for the at least one of the pictures or the scene of the sequence of pictures comprises:
  performing segmentation for the scene or picture, wherein the segmentation comprises performing differentiation of regions with one or more characteristics, wherein the segmentation further comprises assigning one or more coding patterns to one or more regions; and
  performing region-based coding for the one or more regions.
29. The method of Enumerated Example Embodiment wherein coding the plurality of coding units as the function of complexity and the one or more coding method types determined from one or more of the coding decision levels comprises:
  determining whether one or more parameters from the first or second coding decision levels are to be used in the third coding decision level; and
  if the one or more parameters from the first or second coding decision levels are determined to be used in the first or second coding decision levels, copying the one or more parameters from the first or second coding decision levels in the first or second coding decision levels.
30. The method of Enumerated Example Embodiment further comprising:
  in the third coding decision level, allocating any of the parameters by the user, allocating any of the parameters by a system, or allocating any of the parameters using one or more statistics.
31. The method of Enumerated Example Embodiment wherein in the third coding decision level, further comprising selecting at least one of the coding method types based, at least in part, on the one or more allocated parameters.
32. The method of Enumerated Example Embodiment wherein in third coding level, further comprising determining a plurality of candidate coding methods associated with at least one of the plurality of complexity levels.
33. The method of Enumerated Example Embodiment wherein the determining the plurality of candidate coding methods comprises associating the at least one of the plurality of complexity levels based, at least in part, on the one or more characteristics of the encoder, wherein the one or more characteristics comprises a power consumption budget.
34. The method of Enumerated Example Embodiment further comprising:
  assigning the plurality of complexity levels to a plurality of spatial areas; and
  maintaining a targeted complexity budget.
35. The method of Enumerated Example Embodiment further comprising generating at least one of the parameters by at least one of the plurality of candidate coding methods for each of the plurality of coding units based, at least in part, on a complexity budget, wherein the plurality of candidate coding methods are associated with a coding performance metric.
36. The method of Enumerated Example Embodiment wherein in the third coding decision level, the method comprises:
  in the random assignment coding method, randomly-generating a plurality of numbers to map to a plurality of categories; and assigning the plurality of categories with the plurality of coding units, wherein the assigning of the plurality of categories corresponds with the plurality of complexity levels.

37. The method of Enumerated Example Embodiment wherein in the third coding decision level, the method comprises:
in the fixed assignment coding method, encoding the plurality of coding units with the fixed assignment coding method,
wherein the fixed assignment coding method for the third coding decision level comprises using the fixed coding pattern, wherein the fixed coding pattern for the third coding decision level comprises a column-wise pattern, a checker-board pattern, a scan-order pattern, a spiral pattern, a zig-zag pattern, an irregular pattern, a pattern with a plurality of complexity levels, a pattern with random complexity levels, a user-defined pattern, a system-defined pattern, or any combination of the patterns.

38. The method of Enumerated Example Embodiment wherein the one or more features of any of the coding units comprises a DC value, a variance, texture information, edge information, a comparison of variances between at least two areas, a ranking of coding units with a plurality of variances, a segmentation method, a smoothness of one or more areas, category assignments, or any combination of features, wherein the segmentation method comprises any of an object segmentation method, a clustering method, an edge-detection method, a region growing method, or a level set method.

39. The method of Enumerated Example Embodiment wherein in the third coding decision level, the method comprises:
in the adaptive assignment coding method, performing context analysis by analyzing a context or the scene for the plurality of coding units to determine the plurality of complexity levels, wherein the plurality of complexity levels are determined adaptively as a factor of one or more coding characteristics, wherein the one or more coding characteristics comprises an area, a complexity budget, or a quality budget, one or more features of any of the coding units, one or more locations of the coding unit, or any combination of the coding characteristics.

40. The method of Enumerated Example Embodiment wherein the one or more coding characteristics for the one or more locations of the coding unit comprises a boundary coding unit, an internal coding unit, a region of interest (ROI) in a picture, spatial neighboring characteristics, temporal neighboring characteristics, stored context analysis results, or any combination of the one or more coding characteristics.

41. The method of Enumerated Example Embodiment further comprising using a level of complexity with rate distortion optimization (RDO), wherein the level of complexity comprises low complexity RDO, high complexity RDO, RDO with mode skipping, RDO with early termination, or any combination of RDO methods, wherein the low complexity RDO comprises low complexity RDO with H.264/MPEG-4, and wherein the high complexity RDO comprises high complexity RDO with video compression.

42. The method of Enumerated Example Embodiment further comprising using intra coding in I, P, or B slices in any combination.

43. The method of Enumerated Example Embodiment further comprising using a plurality of quantization parameters (QPs) for encoding.

44. A computer program product, tangibly encoded on a computer-readable medium, comprising instructions to cause data processing apparatus to perform video coding operations, the operations comprising:
assigning one or more coding method types of complexity to video for any one of or any combination of coding decision levels associated with a sequence of pictures, a group of pictures (GOP), at least one of the pictures, a scene of the sequence of pictures, a region of the scene or the at least one picture, a block, or a macroblock;
coding a plurality of coding units with a video encoder as a function of complexity and the one or more coding method types determined from one or more of the coding decision levels; and
storing the plurality of coding units in a storage medium or a storage device, wherein:
a first coding decision level is associated with determining a first complexity and a first coding method type for the sequence of pictures,
a second coding decision level is associated with determining a second complexity and a second coding method type for the at least one of the pictures or the scene of the sequence of pictures, wherein the at least one picture or the sequence of pictures comprises the plurality of coding units; and
a third coding decision level is associated with determining a third complexity and a third coding method type for the plurality of coding units.

45. The computer program product of Enumerated Example Embodiment wherein the coding units comprise a macroblock of pixels or a sequence of macroblocks for an area, wherein the sequence of macroblocks correspond to a coding slice, a rate control unit, or a pattern corresponding to an object region.

46. The computer program product of Enumerated Example Embodiment further comprising instructions for the operations for assigning a number of hierarchical levels of coding decision levels.

47. The computer program product of Enumerated Example Embodiment wherein the number of hierarchical levels is selected adaptively.

48. The computer program product of Enumerated Example Embodiment wherein the number of hierarchical levels is selected by a video system user.

49. The computer program product of Enumerated Example Embodiment wherein the first coding decision level comprises a sequence coding level, the second coding decision level comprises a picture coding level or a scene coding level, and the third coding decision level comprises a coding unit coding level.

50. The computer program product of Enumerated Example Embodiment the instructions for the operations further comprising:
in the first coding decision level, allocating a plurality of coding parameters, wherein the allocating comprises:
allocating a pattern decision parameter for complexity allocation at the sequence coding level;
allocating a scene parameter to indicate if scene analysis is used during any of the determinations; and
allocating a map parameter to indicate a map pattern.

51. The computer program product of Enumerated Example Embodiment the instructions for the operations further comprising:

in the first coding decision level, allocating any of the parameters by a user, or allocating any of the parameters using one or more statistics to allocate the one or more parameters.

52. The computer program product of Enumerated Example Embodiment wherein allocating any of the parameters using one or more statistics comprises operations for utilizing statistics on the sequence to invoke one or more pattern maps using one or more of the coding method types.

53. The computer program product of Enumerated Example Embodiment the instructions for the operations further comprising:
in the first coding decision level, selecting at least one of the coding method types based, at least in part, on the one or more allocated parameters, wherein any of the coding method types comprises a fixed assignment coding method, a random assignment coding method, or an adaptive assignment coding method.

54. The computer program product of Enumerated Example Embodiment wherein at least one of the parameters in the plurality of parameters indicates whether every picture in the sequence is to be coded with a same coding method type.

55. The computer program product of Enumerated Example Embodiment wherein any of the coding method types comprises intra coding modes, inter coding modes, or a combination of inter and intra coding modes.

56. The computer program product of Enumerated Example Embodiment wherein any of the coding method types comprises one or more statistical characteristics of an encoder or decoder.

57. The computer program product of Enumerated Example Embodiment the instructions for the operations further comprising allocating one or more complexity levels to one or more spatial areas.

58. The computer program product of Enumerated Example Embodiment wherein, in the first coding decision level, the adaptive assignment coding method uses one or more coding method types and one or more coding patterns for one or more pictures in the sequence or a scene of the sequence.

59. The computer program product of Enumerated Example Embodiment wherein the adaptive assignment coding method is based, at least in part, on a characteristic of an image, a slice type, a prediction mode, a brightness level, a variance, an object analysis, motion, a picture distance from a last scene change, a scene analysis, or one or more characteristics of the encoder.

60. The computer program product of Enumerated Example Embodiment the instructions for the operations further comprising:
in the first coding decision level, determining if scene analysis is enabled or disabled, wherein if scene analysis is disabled, the second coding decision level uses picture-level complexity allocation, and wherein if scene analysis is enabled, the second coding decision level uses scene-level complexity allocation.

61. The computer program product of Enumerated Example Embodiment wherein the scene-level complexity allocation comprises the picture-level complexity allocation.

62. The computer program product of Enumerated Example Embodiment wherein the scene-level complexity allocation comprises operations for classifying one or more transitions in the sequence, wherein the one or more transitions comprises scene changes, fade-ins, fade-outs, or cross-fading, and wherein the scene-level complexity allocation further comprises assigning one or more coding method types to different scenes.

63. The computer program product of Enumerated Example Embodiment wherein, in the second coding decision level, the instructions for the operations comprise:
determining whether the one or more parameters from the first coding decision level are to be used in the second coding decision level; and
if one or more parameters from the first coding decision level are determined to be used in the second coding decision level, copying one or more parameters from the first coding decision level in the second coding decision level.

64. The computer program product of Enumerated Example Embodiment wherein, in the second coding decision level, the instructions for the operations comprise:
selecting at least one of the coding method types for the at least one of the pictures or the scene of the sequence of pictures based, at least in part, on the one or more allocated parameters.

65. The computer program product of Enumerated Example Embodiment the instructions for the operations further comprising selecting the random assignment coding method for the at least one of the pictures or the scene of the sequence of pictures, the random assignment coding method comprises random encoding of the plurality of coding units in the picture or scene.

66. The computer program product of Enumerated Example Embodiment wherein the random assignment coding method for the picture or scene comprises:
assigning randomly-generated numbers to the plurality of coding units using rate distortion optimization (RDO) complexity levels corresponding to the randomly-generated numbers.

67. The computer program product of Enumerated Example Embodiment wherein the random assignment coding method for the picture or scene further comprises:
classifying the complexity using an estimate or a value of a system metric, wherein the system metric comprises an evaluation of the complexity with an amount of memory, a number of required operations, a required amount of time, or a required number of cycles, wherein the randomly-generated numbers are based, at least in part, on a probability or a distribution.

68. The computer program product of Enumerated Example Embodiment the instructions for the operations further comprising selecting the fixed assignment coding method for the at least one of the pictures or the scene of the sequence of pictures, the fixed assignment coding method comprises encoding the plurality of coding units in the picture or scene with the fixed assignment coding method.

69. The computer program product of Enumerated Example Embodiment wherein the fixed assignment coding method comprises using a fixed coding pattern for the picture or scene, wherein the fixed coding pattern comprises a column-wise pattern, a checker-board pattern, a scan-order pattern, a spiral pattern, a zig-zag pattern, an irregular pattern, a pattern with a plurality of complexity levels, a pattern with random complexity levels, a user-defined pattern, a system-defined pattern, or any combination of the patterns.

70. The computer program product of Enumerated Example Embodiment the instructions for the operations further comprising selecting the adaptive assignment coding method for the at least one of the pictures or the scene of the sequence of pictures, the adaptive assignment coding method comprises encoding the plurality of coding units in the picture or scene with the adaptive assignment coding method, wherein the adaptive assignment coding method comprises one or more combinations or variations of the coding method types.
71. The computer program product of Enumerated Example Embodiment wherein the adaptive assignment coding method for the at least one of the pictures or the scene of the sequence of pictures comprises:
performing segmentation for the scene or picture, wherein the segmentation comprises performing differentiation of regions with one or more characteristics, wherein the segmentation further comprises assigning one or more coding patterns to one or more regions; and performing region-based coding for the one or more regions.
72. The computer program product of Enumerated Example Embodiment wherein coding the plurality of coding units as the function of complexity and the one or more coding method types determined from one or more of the coding decision levels comprises:
determining whether one or more parameters from the first or second coding decision levels are to be used in the third coding decision level; and
if one or more parameters from the first or second coding decision levels are determined to be used in the first or second coding decision levels, copying one or more parameters from the first or second coding decision levels in the first or second coding decision levels.
73. The computer program product of Enumerated Example Embodiment the instructions for the operations further comprising:
in the third coding decision level, allocating any of the parameters by the user, allocating any of the parameters by a system, or allocating any of the parameters using one or more statistics.
74. The computer program product of Enumerated Example Embodiment wherein in the third coding decision level, further comprising selecting at least one of the coding method types based, at least in part, on the one or more allocated parameters.
75. The computer program product of Enumerated Example Embodiment wherein in third coding level, the instructions for the operations further comprising determining a plurality of candidate coding methods associated with at least one of the plurality of complexity levels.
76. The computer program product of Enumerated Example Embodiment the instructions for the operations further comprising:
wherein the determining the plurality of candidate coding methods comprises associating the at least one of the plurality of complexity levels based, at least in part, on the one or more characteristics of the encoder, wherein the one or more characteristics comprises a power consumption budget.
77. The computer program product of Enumerated Example Embodiment the instructions for the operations further comprising:
assigning the plurality of complexity levels to a plurality of spatial areas; and
maintaining a targeted complexity budget.
78. The computer program product of Enumerated Example Embodiment the instructions for the operations further comprising generating at least one of the parameters by at least one of the plurality of candidate coding methods for each of the plurality of coding units based, at least in part, on a complexity budget, wherein the plurality of candidate coding methods are associated with a coding performance metric.
79. The computer program product of Enumerated Example Embodiment wherein in the third coding decision level, the instructions for the operations comprise:
in the random assignment coding method, randomly-generating a plurality of numbers to map to a plurality of categories; and
assigning the plurality of categories with the plurality of coding units, wherein the assigning of the plurality of categories corresponds with the plurality of complexity levels.
80. The computer program product of Enumerated Example Embodiment wherein in the third coding decision level, the instructions for the operations comprise:
in the fixed assignment coding method, encoding the plurality of coding units with the fixed assignment coding method,
wherein the fixed assignment coding method for the third coding decision level comprises using the fixed coding pattern, wherein the fixed coding pattern for the third coding decision level comprises a column-wise pattern, a checker-board pattern, a scan-order pattern, a spiral pattern, a zig-zag pattern, an irregular pattern, a pattern with a plurality of complexity levels, a pattern with random complexity levels, a user-defined pattern, a system-defined pattern, or any combination of the patterns.
81. The computer program product of Enumerated Example Embodiment wherein the one or more features of any of the coding units comprises a DC value, a variance, texture information, edge information, a comparison of variances between at least two areas, a ranking of coding units with a plurality of variances, a segmentation method, a smoothness of one or more areas, category assignments, or any combination of features, wherein the segmentation method comprises any of an object segmentation method, a clustering method, an edge-detection method, a region growing method, or a level set method.
82. The computer program product of Enumerated Example Embodiment wherein in the third coding decision level, the instructions for the operations comprise:
in the adaptive assignment coding method, performing context analysis by analyzing a context or the scene for the plurality of coding units to determine the plurality of complexity levels, wherein the plurality of complexity levels are determined adaptively as a factor of one or more coding characteristics, wherein the one or more coding characteristics comprises an area, a complexity budget, or a quality budget, one or more features of any of the coding units, one or more locations of the coding unit, or any combination of the coding characteristics.
83. The computer program product of Enumerated Example Embodiment wherein the one or more coding characteristics for the one or more locations of the coding unit comprises a boundary coding unit, an internal coding unit, a region of interest (ROI) in a picture, spatial neighboring characteristics, temporal neighboring characteristics, stored context analysis results, or any combination of the one or more coding characteristics.
84. The computer program product of Enumerated Example Embodiment the instructions for the operations further comprising using a level of complexity with rate distortion optimization (RDO), wherein the level of complexity comprises low complexity RDO, high complexity RDO, RDO with mode skipping, RDO with early termination, or any combination of RDO methods, wherein the low complexity RDO comprises low complexity RDO with H.264/MPEG-4, and wherein the high complexity RDO comprises high complexity RDO with video compression.

85. The computer program product of Enumerated Example Embodiment the instructions for the operations further comprising using intra coding in I, P, or B slices in any combination.

86. The computer program product of Enumerated Example Embodiment the instructions for the operations further comprising using a plurality of quantization parameters (QPs) for encoding.

87. A system for video coding, the system comprising:
a video encoder configured for operations comprising:
assigning one or more coding method types of complexity to video for any one of or any combination of coding decision levels associated with a sequence of pictures, a group of pictures (GOP), at least one of the pictures, a scene of the sequence of pictures, a region of the scene or the at least one picture, a block, or a macroblock, and
coding a plurality of coding units as a function of complexity and the one or more coding method types determined from one or more of the coding decision levels; and
a storage device for storing the plurality of coding units, wherein:
a first coding decision level is associated with a first complexity and a first coding method type for the sequence of pictures,
a second coding decision level is associated with a second complexity and a second coding method type for the at least one of the pictures or the scene of the sequence of pictures, wherein the at least one picture or the sequence of pictures comprises the plurality of coding units; and
a third coding decision level is associated with a third complexity and a third coding method type for the plurality of coding units.

88. The system of Enumerated Example Embodiment wherein the coding units comprise a macroblock of pixels or a sequence of macroblocks for an area, wherein the sequence of macroblocks correspond to a coding slice, a rate control unit, or a pattern corresponding to an object region.

89. The system of Enumerated Example Embodiment wherein the video encoder is further configured for operations comprising assigning a number of hierarchical levels of coding decision levels.

90. The system of Enumerated Example Embodiment wherein the number of hierarchical levels is selected adaptively.

91. The system of Enumerated Example Embodiment wherein the number of hierarchical levels is selected by a video system user.

92. The system of Enumerated Example Embodiment wherein the first coding decision level comprises a sequence coding level, the second coding decision level comprises a picture coding level or a scene coding level, and the third coding decision level comprises a coding unit coding level.

93. The system of Enumerated Example Embodiment wherein the video encoder is further configured for operations comprising:
in the first coding decision level, allocating a plurality of coding parameters, wherein the allocating comprises:
allocating a pattern decision parameter for complexity allocation at the sequence coding level;
allocating a scene parameter to indicate if scene analysis is used during any of the determinations; and allocating a map parameter to indicate a map pattern.

94. The system of Enumerated Example Embodiment where in the video encoder is further configured for operations comprising:
for the first coding decision level, allocating any of the parameters by a user, or allocating any of the parameters using one or more statistics to allocate the one or more parameters.

95. The system of Enumerated Example Embodiment wherein video encoder operations for allocating any of the parameters using one or more statistics comprises utilizing statistics on the sequence to invoke one or more pattern maps using one or more of the coding method types.

96. The system of Enumerated Example Embodiment wherein the video encoder is further configured for operations comprising:
in the first coding decision level, selecting at least one of the coding method types based, at least in part, on the one or more allocated parameters, wherein any of the coding method types comprises a fixed assignment coding method, a random assignment coding method, or an adaptive assignment coding method.

97. The system of Enumerated Example Embodiment wherein at least one of the parameters in the plurality of parameters indicates whether every picture in the sequence is to be coded with a same coding method type.

98. The system of Enumerated Example Embodiment wherein any of the coding method types comprises intra coding modes, inter coding modes, or a combination of inter and intra coding modes.

99. The system of Enumerated Example Embodiment wherein any of the coding method types comprises one or more statistical characteristics of an encoder or decoder.

100. The system of Enumerated Example Embodiment wherein the video encoder is further configured for operations comprising allocating one or more complexity levels to one or more spatial areas.

101. The system of Enumerated Example Embodiment wherein, for the first coding decision level, the video encoder is configured to have the adaptive assignment coding method to use one or more coding method types and one or more coding patterns for one or more pictures in the sequence or a scene of the sequence.

102. The system of Enumerated Example Embodiment wherein the adaptive assignment coding method is based, at least in part, on a characteristic of an image, a slice type, a prediction mode, a brightness level, a variance, an object analysis, motion, a picture distance from a last scene change, a scene analysis, or one or more characteristics of the encoder.

103. The system of Enumerated Example Embodiment wherein the video encoder is further configured for operations comprising:
in the first coding decision level, determining if scene analysis is enabled or disabled, wherein if scene analysis is disabled, the second coding decision level uses picture-level complexity allocation, and wherein if scene analysis is enabled, the second coding decision level uses scene-level complexity allocation.

104. The system of Enumerated Example Embodiment wherein the scene-level complexity allocation comprises the picture-level complexity allocation.

105. The system of Enumerated Example Embodiment wherein the scene-level complexity allocation comprises classifying one or more transitions in the sequence, wherein the one or more transitions comprises scene changes, fade-ins, fade-outs, or cross-fading, and wherein the scene-level complexity allocation further comprises assigning one or more coding method types to different scenes.

106. The system of Enumerated Example Embodiment wherein, for the second coding decision level, the video encoder is configured for operations comprising:
   determining whether the one or more parameters from the first coding decision level are to be used in the second coding decision level; and
   if one or more parameters from the first coding decision level are determined to be used in the second coding decision level, copying one or more parameters from the first coding decision level in the second coding decision level.

107. The system of Enumerated Example Embodiment wherein, for the second coding decision level, the video encoder is configured for operations comprising:
   selecting at least one of the coding method types for the at least one of the pictures or the scene of the sequence of pictures based, at least in part, on the one or more allocated parameters.

108. The system of Enumerated Example Embodiment the video encoder is further configured for operations comprising selecting the random assignment coding method for the at least one of the pictures or the scene of the sequence of pictures, the random assignment coding method comprises randomly encoding the plurality of coding units in the picture or scene.

109. The system of Enumerated Example Embodiment wherein the random assignment coding method for the picture or scene comprises:
   assigning randomly-generated numbers to the plurality of coding units using rate distortion optimization (RDO) complexity levels corresponding to the randomly-generated numbers.

110. The system of Enumerated Example Embodiment wherein the random assignment coding method for the picture or scene further comprises:
   classifying the complexity using an estimate or a value of a system metric, wherein the system metric comprises an evaluation of the complexity with an amount of memory, a number of required operations, a required amount of time, or a required number of cycles, wherein the randomly-generated numbers are based, at least in part, on a probability or a distribution.

111. The system of Enumerated Example Embodiment wherein the video encoder is further configured for operations comprising selecting the fixed assignment coding method for the at least one of the pictures or the scene of the sequence of pictures, the fixed assignment coding method comprises encoding the plurality of coding units in the picture or scene with the fixed assignment coding method.

112. The system of Enumerated Example Embodiment wherein the fixed assignment coding method comprises using a fixed coding pattern for the picture or scene, wherein the fixed coding pattern comprises a column-wise pattern, a checker-board pattern, a scan-order pattern, a spiral pattern, a zig-zag pattern, an irregular pattern, a pattern with a plurality of complexity levels, a pattern with random complexity levels, a user-defined pattern, a system-defined pattern, or any combination of the patterns.

113. The system of Enumerated Example Embodiment wherein the video encoder further comprises operations comprising selecting the adaptive assignment coding method for the at least one of the pictures or the scene of the sequence of pictures, the adaptive assignment coding method comprises encoding the plurality of coding units in the picture or scene with the adaptive assignment coding method, wherein the adaptive assignment coding method comprises one or more combinations or variations of the coding method types.

114. The system of Enumerated Example Embodiment wherein the adaptive assignment coding method for the at least one of the pictures or the scene of the sequence of pictures comprises:
   performing segmentation for the scene or picture, wherein the segmentation comprises performing differentiation of regions with one or more characteristics, wherein the segmentation further comprises assigning one or more coding patterns to one or more regions; and performing region-based coding for the one or more regions.

115. The system of Enumerated Example Embodiment wherein the coding the plurality of coding units as the function of complexity and the one or more coding method types determined from one or more of the coding decision levels comprises:
   determining whether one or more parameters from the first or second coding decision levels are to be used in the third coding decision level; and
   if one or more parameters from the first or second coding decision levels are determined to be used in the first or second coding decision levels, copying one or more parameters from the first or second coding decision levels in the first or second coding decision levels.

116. The system of Enumerated Example Embodiment the video encoder is further configured for operations comprising:
   in the third coding decision level, allocating any of the parameters by the user, allocating any of the parameters by a system, or allocating any of the parameters using one or more statistics.

117. The system of Enumerated Example Embodiment wherein for the third coding decision level, the video encoder is configured for operations including selecting at least one of the coding method types based, at least in part, on the one or more allocated parameters.

118. The system of Enumerated Example Embodiment wherein for third coding level, the video encoder is configured for operations comprising determining a plurality of candidate coding methods associated with at least one of the plurality of complexity levels.

119. The system of Enumerated Example Embodiment wherein the video encoder is configured for operations comprising:
   wherein the determining the plurality of candidate coding methods comprises associating the at least one of the plurality of complexity levels based, at least in part, on the one or more characteristics of the encoder, wherein the one or more characteristics comprises a power consumption budget.

120. The system of Enumerated Example Embodiment wherein the video encoder is configured for operations comprising:
   assigning the plurality of complexity levels to a plurality of spatial areas; and
   maintaining a targeted complexity budget.

121. The system of Enumerated Example Embodiment wherein the video encoder is configured for operations comprising generating at least one of the parameters by at least one of the plurality of candidate coding methods for each of the plurality of coding units based, at least in part, on a complexity budget, wherein the plurality of candidate coding methods are associated with a coding performance metric.

122. The system of Enumerated Example Embodiment wherein for the third coding decision level, the video encoder is configured for operations comprising:
in the random assignment coding method, randomly-generating a plurality of numbers to map to a plurality of categories; and
assigning the plurality of categories with the plurality of coding units, wherein the assigning of the plurality of categories corresponds with the plurality of complexity levels.

123. The system of Enumerated Example Embodiment wherein for the third coding decision level, the video encoder is configured for operations comprising:
in the fixed assignment coding method, encoding the plurality of coding units with the fixed assignment coding method,
wherein the fixed assignment coding method for the third coding decision level comprises using the fixed coding pattern, wherein the fixed coding pattern for the third coding decision level comprises a column-wise pattern, a checker-board pattern, a scan-order pattern, a spiral pattern, a zig-zag pattern, an irregular pattern, a pattern with a plurality of complexity levels, a pattern with random complexity levels, a user-defined pattern, a system-defined pattern, or any combination of the patterns.

124. The system of Enumerated Example Embodiment wherein the one or more features of any of the coding units comprises a DC value, a variance, texture information, edge information, a comparison of variances between at least two areas, a ranking of coding units with a plurality of variances, a segmentation method, a smoothness of one or more areas, category assignments, or any combination of features, wherein the segmentation method comprises any of an object segmentation method, a clustering method, an edge-detection method, a region growing method, or a level set method.

125. The system of Enumerated Example Embodiment wherein for the third coding decision level, the video encoder is configured for operations comprising:
in the adaptive assignment coding method, performing context analysis by analyzing a context or the scene for the plurality of coding units to determine the plurality of complexity levels, wherein the plurality of complexity levels are determined adaptively as a factor of one or more coding characteristics, wherein the one or more coding characteristics comprises an area, a complexity budget, or a quality budget, one or more features of any of the coding units, one or more locations of the coding unit, or any combination of the coding characteristics.

126. The system of Enumerated Example Embodiment wherein the one or more coding characteristics for the one or more locations of the coding unit comprises a boundary coding unit, an internal coding unit, a region of interest (ROI) in a picture, spatial neighboring characteristics, temporal neighboring characteristics, stored context analysis results, or any combination of the one or more coding characteristics.

127. The system of Enumerated Example Embodiment wherein the video encoder is further configured for operations for using a level of complexity with rate distortion optimization (RDO), wherein the level of complexity comprises low complexity RDO, high complexity RDO, RDO with mode skipping, RDO with early termination, or any combination of RDO methods, wherein the low complexity RDO comprises low complexity RDO with H.264/MPEG-4, and wherein the high complexity RDO comprises high complexity RDO with video compression.

128. The system of Enumerated Example Embodiment herein the video encoder is further configured for operations including using intra coding in I, P, or B slices in any combination.

129. The system of Enumerated Example Embodiment wherein the video encoder is further configured for operations including using a plurality of quantization parameters (QPs) for encoding.

130. The system of Enumerated Example Embodiment further comprising a decoder for decoding the video.

131. An encoder of video information comprising:
one or more processors; and a computer readable storage medium that comprises instructions which, when executed with the one or more processors, cause the one or more processors to perform, at least in part, a process as recited in one or more of Enumerated Example Embodiments 1-43.

132. An apparatus, comprising:
one or more processors; and a computer readable storage medium that comprises instructions which, when executed with the one or more processors, cause the one or more processors to perform, at least in part, a process as recited in one or more of Enumerated Example Embodiments 1-43.

133. A system, comprising:
means for performing one or more process steps as recited in one or more of Enumerated Example Embodiments 1-43.

134. An integrated circuit (IC) device that encodes video information according to one or more process steps as recited in one or more of Enumerated Example Embodiments 1-43.

135. The IC device as recited in Enumerated Example Embodiment 134 comprising at least one of a programmable logic device (PLD), a field programmable gate array (FPGA), a digital signal processor (DSP), or an application specific IC (ASIC) device.

136. A computer readable storage medium comprising instructions which, when executed with the one or more processors, cause the one or more processors to:
perform, at least in part, a process as recited in one or more of Enumerated Example Embodiments 1-43,
program a system, encoder or apparatus as recited in one or more of Enumerated Example Embodiments 87-133; or program or configure an IC device as recited in one or more of Enumerated Example Embodiments 134-135.

137. A use for a computer comprising:
performing a process as recited in one or more of Enumerated Example Embodiments 1-43.
Particular embodiments of the disclosure have been described, other embodiments are within the scope of the following claims.

What is claimed is:
1. A method for coding video with a complexity-scalable coding mode decision scheme for a video coding system, the method comprising:
identifying at least a spatial area associated with the video;

determining one or more characteristics of at least the spatial area, wherein the one or more characteristics include statistical characteristics;

assigning a complexity level to at least the spatial area using the one or more determined characteristics, wherein the complexity level at least relates to computational resources for the video coding system, wherein the assigning comprises assigning one or more coding method types for the complexity level for any one of or any combination of coding decision levels, wherein the coding decision levels comprise a first coding decision level, a second coding decision level, and a third coding decision level, wherein the coding decision levels are hierarchically arranged, and wherein the video coding system is configured for at least a random assignment coding method; and coding a plurality of coding units as a function of the complexity level and the one or more coding method types determined from one or more of the coding decision levels, wherein the coding units comprise a macroblock of pixels or a sequence of macroblocks for the spatial area;

wherein:
the coding decision levels are associated with a sequence of pictures, a group of pictures (GOP), at least one of the pictures, a scene of the sequence of pictures, a region of the scene or the at least one picture, a block, or the macroblock,
the first coding decision level is associated with determining a first complexity level and a first coding method type for the sequence of pictures, wherein the first coding decision level comprises a sequence coding level,
the second coding decision level is associated with determining a second complexity level and a second coding method type for the at least one of the pictures or the scene of the sequence of pictures, wherein the at least one picture or the sequence of pictures comprises the plurality of coding units, and wherein the second coding decision level comprises a picture coding level or a scene coding level, and
the third coding decision level is associated with determining a third complexity level and a third coding method type for the plurality of coding units, wherein the third coding decision level comprises a coding unit coding level, wherein the random assignment coding method includes:
randomly encoding the plurality of coding units, and
assigning randomly-generated numbers to the plurality of coding units.

2. The method of claim 1, further comprising:
in the first coding decision level, allocating a plurality of coding parameters, wherein the plurality of coding parameters comprises a pattern decision parameter, a scene parameter, and a map parameter, wherein the allocating comprises:
allocating the pattern decision parameter for complexity allocation at the sequence coding level;
allocating the scene parameter to indicate a use of scene analysis for any of the determinations; and
allocating the map parameter to indicate a pattern map.

3. The method of claim 2, further comprising:
in the first coding decision level,
allocating any of the parameters in response to a user input or allocating any of the parameters using one or more statistics, wherein the sequence of macroblocks correspond to a coding slice, a rate control unit, or a pattern corresponding to an object region;
selecting at least one of the coding method types based on the one or more allocated parameters, wherein at least one of the parameters in the plurality of parameters indicates whether every picture in the sequence is to be coded with a same coding method type,
wherein the video coding system comprises an encoder or a decoder;
wherein any of the coding method types comprises one or more statistical characteristics associated with the encoder or the decoder.

4. The method of claim 3, wherein, in the first coding decision level, an adaptive assignment coding method utilizes one or more coding method types and one or more coding patterns for one or more pictures in the sequence or a scene of the sequence,
wherein the adaptive assignment coding method is dependent on a characteristic of an image, a slice type, a prediction mode, a brightness level, a variance, an object analysis, motion, a picture distance from a last scene change, a scene analysis, or one or more characteristics of the encoder.

5. The method of claim 4 further comprising:
in the first coding decision level, determining if scene analysis is enabled or disabled, wherein if scene analysis is disabled, the second coding decision level utilizes picture-level complexity allocation, and wherein if scene analysis is enabled, the second coding decision level uses scene-level complexity allocation, wherein for the picture-level complexity allocation a plurality of pictures are encoded with a predetermined coding method.

6. The method of claim 5, wherein:
the scene-level complexity allocation comprises the picture-level complexity allocation, or
the scene-level complexity allocation comprises classifying one or more transitions in the sequence, wherein the one or more transitions comprises scene changes, fade-ins, fade-outs, or cross-fading, and wherein the scene-level complexity allocation further comprises assigning one or more coding method types to different scenes.

7. The method of claim 6, wherein, in the second coding decision level, the method comprises:
determining whether the one or more parameters from the first coding decision level are to be used in the second coding decision level;
if one or more parameters from the first coding decision level are determined to be used in the second coding decision level, copying one or more parameters from the first coding decision level in the second coding decision level to provide access to the one or more copied parameters in the second coding decision level; and
selecting at least one of the coding method types for the at least one of the pictures or the scene of the sequence of pictures based on the one or more allocated parameters.

8. The method of claim 7, wherein the selection of the random assignment coding method for the at least one of the pictures or the scene of the sequence of pictures comprises randomly encoding the plurality of coding units in the picture or scene;
assigning the randomly-generated numbers to the plurality of coding units using rate distortion optimization (RDO) complexity levels corresponding to the randomly-generated numbers; and classifying the complexity levels using an estimate or a value of a system metric, wherein the system metric comprises an evaluation of the complexity levels with an amount of memory, a number of required operations, a required amount of time, or a required number of cycles, wherein the randomly-generated numbers are based on a probability or a distribution.

9. The method of claim 8, wherein the selection of a fixed assignment coding method for the at least one of the pictures or the scene of the sequence of pictures comprises encoding the plurality of coding units in the picture or scene with the fixed assignment coding method,
wherein the fixed assignment coding method comprises using a fixed coding pattern for the picture or scene, and
wherein the fixed coding pattern comprises a column-wise pattern, a checker-board pattern, a scan-order pattern, a spiral pattern, a zig-zag pattern, an irregular pattern, a pattern with a plurality of complexity levels, a pattern with random complexity levels, a user-defined pattern, a system-defined pattern, or any combination of the patterns.

10. The method of claim 9, wherein the selection of an adaptive assignment coding method for the at least one of the pictures or the scene of the sequence of pictures comprises encoding the plurality of coding units in the picture or scene with the adaptive assignment coding method, wherein the adaptive assignment coding method comprises one or more combinations or variations of the coding method types;
performing segmentation for the scene or picture, wherein the segmentation comprises performing differentiation of regions with one or more characteristics, wherein the segmentation further comprises assigning one or more coding patterns to one or more regions; and
performing region-based coding for the one or more regions.

11. The method of claim 10, wherein coding the plurality of coding units as the function of the complexity level and the one or more coding method types determined from one or more of the coding decision levels comprises:
determining whether one or more parameters from the first or second coding decision levels are to be used in the third coding decision level; and
if the one or more parameters from the first or second coding decision levels are determined to be used in the third coding decision level, copying the one or more parameters from the first or second coding decision levels to the third coding decision level to provide access to the one or more copied parameters in the third coding decision level.

12. The method of claim 11, further comprising:
in the third coding decision level,
allocating any of the parameters in response to the user input, allocating any of the parameters by a system, or allocating any of the parameters using one or more statistics;
selecting at least one of the coding method types based on the one or more allocated parameters; and
determining a plurality of candidate coding methods associated with at least one of the plurality of complexity levels, wherein determining the plurality of candidate coding methods comprises associating the at least one of the plurality of complexity levels based on the one or more characteristics of the encoder or the decoder, wherein the one or more characteristics comprises a power consumption budget.

13. The method of claim 12, further comprising generating at least one of the parameters by at least one of the plurality of candidate coding methods for each of the plurality of coding units based on a complexity budget that relates to an allocation of the computational resources for the video coding system, wherein the plurality of candidate coding methods are associated with a coding performance metric.

14. The method of claim 13, wherein in the third coding decision level, the method comprises:
in the random assignment coding method, randomly-generating the plurality of numbers to map to a plurality of categories; and
assigning the plurality of categories with the plurality of coding units, wherein the assigning of the plurality of categories corresponds with the plurality of complexity levels.

15. The method of claim 14, wherein in the third coding decision level, the method comprises:
in the fixed assignment coding method, encoding the plurality of coding units with the fixed assignment coding method,
wherein the fixed assignment coding method for the third coding decision level comprises using the fixed coding pattern, wherein the fixed coding pattern for the third coding decision level comprises a column-wise pattern, a checker-board pattern, a scan-order pattern, a spiral pattern, a zig-zag pattern, an irregular pattern, a pattern with a plurality of complexity levels, a pattern with random complexity levels, a user-defined pattern, a system-defined pattern, or any combination of the patterns.

16. The method of claim 15, wherein one or more features of any of the coding units comprises a DC value, a variance, texture information, edge information, a comparison of variances between at least two areas, a ranking of coding units with a plurality of variances, a segmentation method, a smoothness of one or more areas, category assignments, or any combination of features, wherein the segmentation method comprises any of an object segmentation method, a clustering method, an edge-detection method, a region growing method, or a level set method.

17. The method of claim 15, wherein in the third coding decision level, the method comprises:
in the adaptive assignment coding method, performing context analysis by analyzing a context or the scene for the plurality of coding units to determine the plurality of complexity levels, wherein the plurality of complexity levels are determined adaptively as a factor of one or more coding characteristics, wherein the one or more coding characteristics comprises an area, a complexity budget, or a quality budget, one or more features of any of the coding units, one or more locations of the coding unit, or any combination of the coding characteristics.

18. The method of claim 17, wherein the one or more coding characteristics for the one or more locations of the coding unit comprises a boundary coding unit, an internal coding unit, a region of interest (ROI) in a picture, spatial neighboring characteristics, temporal neighboring characteristics, stored context analysis results, or any combination of the one or more coding characteristics.

19. The method of claim 1, further comprising defining other complexity levels with rate distortion optimization (RDO), wherein the other complexity levels comprise a first level complexity RDO, a second level complexity RDO, RDO with mode skipping, RDO with early termination, wherein the first level complexity RDO involves a lower amount of computational resources for the video coding system than the second level complexity RDO, wherein the first level complexity RDO comprises H.264/MPEG-4, and wherein the second level complexity RDO comprises video compression.

20. A system for coding video with a complexity-scalable coding mode decision scheme for a video coding system, the system comprising:
means for identifying at least a spatial area associated with the video;
means for determining one or more characteristics of at least the spatial area, wherein the one or more characteristics include statistical characteristics;
means for assigning a complexity level to at least the spatial area using the one or more determined characteristics, wherein the complexity level at least relates to computational resources for the video coding system, wherein the assigning means comprises means for assigning one or more coding method types for the complexity level for any one of or any combination of coding decision levels, wherein the coding decision levels comprise a first coding decision level, a second coding decision level, and a third coding decision level, wherein the coding decision levels are hierarchically arranged, and wherein the video system is configured for at least a random assignment coding method; and
means for coding a plurality of coding units as a function of the complexity level and the one or more coding method types determined from one or more of the coding decision levels, wherein the coding units comprise a macroblock of pixels or a sequence of macroblocks for the spatial area;
wherein:
the coding decision levels are associated with a sequence of pictures, a group of pictures (GOP), at least one of the pictures, a scene of the sequence of pictures, a region of the scene or the at least one picture, a block, or the macroblock;
the first coding decision level is associated with determining a first complexity level and a first coding method type for the sequence of pictures, wherein the first coding decision level comprises a sequence coding level;
the second coding decision level is associated with determining a second complexity level and a second coding method type for the at least one of the pictures or the scene of the sequence of pictures, wherein the at least one picture or the sequence of pictures comprises the plurality of coding units, and wherein the second coding decision level comprises a picture coding level or a scene coding level; and
the third coding decision level is associated with determining a third complexity level and a third coding method type for the plurality of coding units, wherein the third coding decision level comprises a coding unit coding level,
wherein the random assignment coding method includes:
randomly encoding the plurality of coding units, and
assigning randomly-generated numbers to the plurality of coding units.

21. A computer system, comprising:
at least one processor; and
a computer readable storage medium that comprises encoded instructions which, when executing with at least one processor, cause the processor to perform, control or execute, at least in part, a process for coding video with a complexity-scalable coding mode decision scheme for a video coding system, the process comprising the steps of:
identifying at least a spatial area associated with the video;
determining one or more characteristics of at least the spatial area, wherein the one or more characteristics include statistical characteristics;
assigning a complexity level to at least the spatial area using the one or more determined characteristics, wherein the complexity level at least relates to computational resources for the video coding system, wherein the assigning comprises assigning one or more coding method types for the complexity level for any one of or any combination of coding decision levels, wherein the coding decision levels comprise a first coding decision level, a second coding decision level, and a third coding decision level, wherein the coding decision levels are hierarchically arranged, and wherein the computer system is configured for at least a random assignment coding method; and
coding a plurality of coding units as a function of the complexity level and the one or more coding method types determined from one or more of the coding decision levels, wherein the coding units comprise a macroblock of pixels or a sequence of macroblocks for the spatial area;
wherein:
the coding decision levels are associated with a sequence of pictures, a group of pictures (GOP), at least one of the pictures, a scene of the sequence of pictures, a region of the scene or the at least one picture, a block, or the macroblock,
the first coding decision level is associated with determining a first complexity level and a first coding method type for the sequence of pictures, wherein the first coding decision level comprises a sequence coding level,
the second coding decision level is associated with determining a second complexity level and a second coding method type for the at least one of the pictures or the scene of the sequence of pictures, wherein the at least one picture or the sequence of pictures comprises the plurality of coding units, and wherein the second coding decision level comprises a picture coding level or a scene coding level, and
the third coding decision level is associated with determining a third complexity level and a third coding method type for the plurality of coding units, wherein the third coding decision level comprises a coding unit coding level,
wherein the random assignment coding method includes:
randomly encoding the plurality of coding units, and
assigning randomly-generated numbers to the plurality of coding units.

22. A video encoding apparatus, comprising:
at least one processor; and
a computer readable storage medium that comprises encoded instructions which, when executing with at least one processor, cause the processor to perform, control or execute, at least in part, a process for coding video with a complexity-scalable coding mode decision scheme for a video coding system, the process comprising the steps of:
identifying at least a spatial area associated with the video;

determining one or more characteristics of at least the spatial area, wherein the one or more characteristics include statistical characteristics;

assigning a complexity level to at least the spatial area using the one or more determined characteristics, wherein the complexity level at least relates to computational resources for the video coding system, wherein the assigning comprises assigning one or more coding method types for the complexity level for any one of or any combination of coding decision levels, wherein the coding decision levels comprise a first coding decision level, a second coding decision level, and a third coding decision level, wherein the coding decision levels are hierarchically arranged, and wherein the video encoding apparatus is configured for at least a random assignment coding method; and coding a plurality of coding units as a function of the complexity level and the one or more coding method types determined from one or more of the coding decision levels, wherein the coding units comprise a macroblock of pixels or a sequence of macroblocks for the spatial area;

wherein:
the coding decision levels are associated with a sequence of pictures, a group of pictures (GOP), at least one of the pictures, a scene of the sequence of pictures, a region of the scene or the at least one picture, a block, or the macroblock, the first coding decision level is associated with determining a first complexity level and a first coding method type for the sequence of pictures, wherein the first coding decision level comprises a sequence coding level, the second coding decision level is associated with determining a second complexity level and a second coding method type for the at least one of the pictures or the scene of the sequence of pictures, wherein the at least one picture or the sequence of pictures comprises the plurality of coding units, and wherein the second coding decision level comprises a picture coding level or a scene coding level, and the third coding decision level is associated with determining a third complexity level and a third coding method type for the plurality of coding units, wherein the third coding decision level comprises a coding unit coding level, wherein the random assignment coding method includes:
randomly encoding the plurality of coding units, and
assigning randomly-generated numbers to the plurality of coding units.

23. An Integrated Circuit (IC), comprising:
an array of active logic devices;
a plurality of conductors that electrically couple with one or more of the active logic devices;
an input electrically coupled to one or more of the conductors for providing at least a first signal thereto; and
an output electrically coupled to one or more of the conductors for receiving at least a second signal therefrom,
wherein the plurality of logic gates are arrayed, programmed or configured to perform, control or execute, at least in part, a process for coding video with a complexity-scalable coding mode decision scheme for a video coding system, the process comprising the steps of:

identifying at least a spatial area associated with the video;

determining one or more characteristics of at least the spatial area, wherein the one or more characteristics include statistical characteristics;

assigning a complexity level to at least the spatial area using the one or more determined characteristics, wherein the complexity level at least relates to computational resources for the video coding system, wherein the assigning comprises assigning one or more coding method types for the complexity level for any one of or any combination of coding decision levels, wherein the coding decision levels comprise a first coding decision level, a second coding decision level, and a third coding decision level, wherein the coding decision levels are hierarchically arranged, and wherein the integrated circuit is configured for at least a random assignment coding method; and coding a plurality of coding units as a function of the complexity level and the one or more coding method types determined from one or more of the coding decision levels, wherein the coding units comprise a macroblock of pixels or a sequence of macroblocks for the spatial area;

wherein:
the coding decision levels are associated with a sequence of pictures, a group of pictures (GOP), at least one of the pictures, a scene of the sequence of pictures, a region of the scene or the at least one picture, a block, or the macroblock, the first coding decision level is associated with determining a first complexity level and a first coding method type for the sequence of pictures, wherein the first coding decision level comprises a sequence coding level, the second coding decision level is associated with determining a second complexity level and a second coding method type for the at least one of the pictures or the scene of the sequence of pictures, wherein the at least one picture or the sequence of pictures comprises the plurality of coding units, and wherein the second coding decision level comprises a picture coding level or a scene coding level, and the third coding decision level is associated with determining a third complexity level and a third coding method type for the plurality of coding units, wherein the third coding decision level comprises a coding unit coding level, wherein the random assignment coding method includes:
randomly encoding the plurality of coding units, and
assigning randomly-generated numbers to the plurality of coding units.

24. A computer system, comprising:
a bus;
one or more processors coupled to the bus; and
a non-transitory computer readable storage medium that comprises encoded instructions which, when executing with the one or more processors, programs, controls or configures the computer system for coding video with a complexity-scalable coding mode decision scheme for a video coding system, wherein the computer system is programmed, controlled or configured to further comprise:
an identifier for identifying at least a spatial area associated with the video;

a determiner for determining one or more characteristics of at least the spatial area, wherein the one or more characteristics include statistical characteristics;

an assigner for assigning a complexity level to at least the spatial area using the one or more determined characteristics, wherein the complexity level at least relates to computational resources for the video coding system, wherein the assigner assigns one or more coding method types for the complexity level for any one of or any combination of coding decision levels, wherein the coding decision levels comprise a first coding decision level, a second coding decision level, and a third coding decision level, wherein the coding decision levels are hierarchically arranged, and wherein the computer system is configured for at least a random assignment coding method; and a coder for coding a plurality of coding units as a function of the complexity level and the one or more coding method types determined from one or more of the coding decision levels, wherein the coding units comprise a macroblock of pixels or a sequence of macroblocks for the spatial area;

wherein:
the coding decision levels are associated with a sequence of pictures, a group of pictures (GOP), at least one of the pictures, a scene of the sequence of pictures, a region of the scene or the at least one picture, a block, or the macroblock, the first coding decision level is associated with determining a first complexity level and a first coding method type for the sequence of pictures, wherein the first coding decision level comprises a sequence coding level, the second coding decision level is associated with determining a second complexity level and a second coding method type for the at least one of the pictures or the scene of the sequence of pictures, wherein the at least one picture or the sequence of pictures comprises the plurality of coding units, and wherein the second coding decision level comprises a picture coding level or a scene coding level, and the third coding decision level is associated with determining a third complexity level and a third coding method type for the plurality of coding units, wherein the third coding decision level comprises a coding unit coding level, wherein the random assignment coding method includes:
randomly encoding the plurality of coding units, and
assigning randomly-generated numbers to the plurality of coding units.

* * * * *